United States Patent
Tsuyama

(10) Patent No.: US 6,270,227 B1
(45) Date of Patent: Aug. 7, 2001

(54) REMOTE-CONTROLLED MIRROR APPARATUS FOR VEHICLES

(75) Inventor: Osamu Tsuyama, Hiratsuka (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/432,772

(22) Filed: Nov. 3, 1999

(30) Foreign Application Priority Data

Nov. 11, 1998 (JP) .................................................. 10-321024
Nov. 11, 1998 (JP) .................................................. 10-321025
Nov. 11, 1998 (JP) .................................................. 10-321026
Nov. 11, 1998 (JP) .................................................. 10-321029

(51) Int. Cl.$^7$ .................................................. G02B 7/182
(52) U.S. Cl. ........................ 359/871; 359/872; 359/873; 359/874; 359/875
(58) Field of Search .................................. 359/871, 872, 359/873, 874, 875, 876, 877; 248/477, 479

(56) References Cited

U.S. PATENT DOCUMENTS

| | | | |
|---|---|---|---|
| 4,159,866 | * 7/1979 | Wunsch et al. | 359/871 |
| 5,566,029 | * 10/1996 | Zebold | 359/872 |
| 5,796,532 | 8/1998 | Kanazawa | 359/858 |

FOREIGN PATENT DOCUMENTS 8-26031   1/1996 (JP) .

* cited by examiner

*Primary Examiner*—Mohammad Sikder
(74) *Attorney, Agent, or Firm*—Foley & Lardner

(57) ABSTRACT

A power unit is attached on one end of a stay as an angle adjustment mechanism, with a mirror holder that has a configuration of housing mounted on the power unit to be capable of tilting, while the mirror holder holds the mirror body and the power unit is housed in a chamber defined by the mirror body and the mirror holder, so that the mirror body and the mirror holder are tilted with respect to the stay and the power unit by the power unit, thereby adjusting the angle. Thus a mirror housing, that contains the power unit, of the prior art located on the fixed side together with the power unit and the stay is eliminated and, instead, the mirror holder having a configuration of housing is installed together with the mirror body on the tilting side. As a consequence, when the mirror body is tilted with respect to the power unit and the stay, the mirror holder is also tilted along with the mirror body with respect to the power unit and the stay, and therefore such a problem does not occur as the edge of the mirror body comes inside the opening edge of the mirror housing on the fixed side as in the case of the prior art. As a result, it is made possible to secure a wide field of view without the possibility of causing an obstacle to the field of view when adjusting the angle of the mirror body.

13 Claims, 23 Drawing Sheets

REMOTE-CONTROLLED MIRROR APPARATUS FOR VEHICLES

BACKGROUND OF THE INVENTION a) Field of the Invention

The present invention relates to a remote-controlled mirror apparatus for vehicles that, when attached to a vehicle such as one-box car or recreational vehicle, allows it to view and perceive in a predetermined field around a desired direction by means of the reflection of a mirror body, and makes it possible to change the direction of view by changing the angle of the mirror body through remote control, and particularly to a remote-controlled mirror apparatus for vehicles that is free from obstacles to the view associated with the adjustment of the mirror body angle and is capable of ensuring wider field of view.

b) Description of the Prior Art

A remote-controlled mirror apparatus for vehicles of the prior art comprises, as shown in FIG. 1, a stay 100 one end of which is attached to a vehicle body, a mirror housing 102 fastened on the other end of the stay 100, a power unit 103 mounted as an angle adjusting mechanism in the mirror housing 102, a mirror holder (back board) 104 attached, to be capable of adjusting the angle thereof, to the power unit 103 via a pivot mechanism 105 and an advance-retract rod 106, and a mirror body 101 held on the mirror holder 104.

An example of the remote-controlled mirror apparatus for vehicles described above is disclosed in Japanese Patent Application Laid-open No. H8-26031. The remote-controlled mirror apparatus for vehicles disclosed in this publication is used as side mirrors for heavy duty vehicles such as truck and bus, and is attached to the vehicle body via a cylindrical support arm instead of the stay 100.

The mirror body 101 is limited in size so as not to obstruct the field of view when a driver looks back directly. But even when the mirror body 101 is limited in size, a wide field of view can be ensured by decreasing the radius of curvature of the reflecting surface.

The above mentioned power unit 103 is provided with, in addition to the advance-retract rod 106 for vertical adjustment shown in the drawings, an advance-retract rod for horizontal adjustment, for example, not shown.

An example of application of the remote-controlled mirror apparatus for vehicles of the prior art mentioned above will now be described below with reference to FIG. 2 through FIG. 4.

In this application, the remote-controlled mirror apparatus is used as an electrically powered and remote-controlled rear under mirror apparatus for automobiles, being mounted by attaching an end of the stay 100 on the rear top of a vehicle body such as one-box car or recreational vehicle C.

The remote-controlled mirror apparatus for vehicles enables it to view a range indicated by dashed line in a lower portion at the back of vehicle C such as one-box car or recreational vehicle, from the eye point E.P. of the driver via the mirror body 101. Namely, it becomes possible to view and perceive within a predetermined field around a desired direction by means of the reflection of the mirror body 101.

When the advance-retract rod 106 for vertical adjustment is moved forward by the power unit 103, the mirror body 101 is driven via the mirror holder 104 to tilt down (position indicated by alternate dot and dash line in FIG. 1) about a horizontal axis (line connecting the center of the pivot mechanism 105 and the center of the advance-retract rod for horizontal adjustment). This changes the field of view (range which can be viewed and perceived) in a lower portion at the back of vehicle C such as one-box car or recreational vehicle from that indicated by dashed line in FIG. 2 to that indicated by alternate dot and dash line in FIG. 2. That is, viewing direction is changed to backward.

When the advance-retract rod 106 for vertical adjustment is moved backward, the mirror body 101 tilts upward (position indicated by alternate double-dot and dash line in FIG. 1) about the horizontal axis and the field of view changes from that indicated by dashed line in FIG. 2 to that indicated by alternate double-dot and dash line in FIG. 2, and the viewing direction changes to forward.

Further, when the advance-retract rod for horizontal adjustment is moved forward (or backward), the mirror body 101 tilts to the left about a vertical axis (line connecting the center of the pivot mechanism 105 and the center of the advance-retract rod 106 for vertical adjustment), and the field of view changes from that indicated by dashed line in FIG. 3 and FIG. 4 to that indicated by alternate dot and dash line in FIG. 3 and FIG. 4, so that the viewing direction changes to the left.

Also when the advance-retract rod for horizontal adjustment is moved backward (or forward), the mirror body 101 tilts to the right about the vertical axis, and the field of view changes from that indicated by dashed line in FIG. 3 and FIG. 4 to that indicated by alternate double-dot and dash line in FIG. 3 and FIG. 4, so that the viewing direction changes to the right.

However, in the remote-controlled mirror apparatus for vehicles of the prior art described above, the mirror housing 102 that houses the power unit 103 is located along with the power unit 103 and the stay 100 on the fixed side, while the mirror body 101 is located along with the mirror holder 104 on the tilting side that tilts with respect to the fixed side, as shown in FIG. 1. As a result, when the mirror body 101 is tilted with respect to the mirror housing 102, edge of the mirror body 101 may come inside the opening edge of the mirror housing 102. For example, when the mirror body 101 is tilted downward as indicated by alternate dot and dash line in FIG. 1, lower edge of the mirror body 101 comes inside the lower opening edge of the mirror housing 102. When the mirror body 101 is tilted upward as indicated by alternate double-dot and dash line in FIG. 1, upper edge of the mirror body 101 comes inside the upper opening edge of the mirror housing 102. In case the edge of the mirror body 101 comes inside the opening edge of the mirror housing 102, the opening edge of the mirror housing 102 may be reflected on the mirror body 101 and make an obstacle to the view. Obstruction to the view when adjusting the angle of the mirror body 101 becomes conspicuous particularly in the case of the mirror body 101 having a small radius of curvature.

SUMMARY OF THE INVENTION

An object of the present invention is to provide a remote-controlled mirror apparatus for vehicles that is capable of securing a wide field of view without the possibility of causing an obstacle to the field of view when adjusting the angle of the mirror body.

According to the present invention, in order to achieve the object described above, a power unit is attached to one end of a stay as an angle adjusting mechanism, a mirror holder having a configuration of housing is attached to the power unit to be capable of tilting, a mirror body is held on the mirror holder, the power unit is housed in a chamber defined by the mirror body and the mirror holder, and the angle of said mirror body, together with the mirror holder, is adjusted with respect to the stay and power unit by means of the power unit.

Thus in the remote-controlled mirror apparatus for vehicles of the present invention, the mirror housing of the prior art, that houses the power unit, located on the fixed side together with the power unit and the stay is eliminated and, instead, the mirror holder having a configuration of housing that houses the power unit is installed together with the mirror body on the tilting side. Consequently, when the mirror body is tilted with respect to the power unit and the stay, the mirror holder is also tilted together with the mirror body with respect to the power unit and the stay, and therefore such a problem does not occur as the edge of the mirror body comes inside the opening edge of the mirror housing on the fixed side as in the case of the prior art. As a result, it becomes possible to secure a wide field of view without the possibility of causing an obstacle to the field of view when adjusting the angle of the mirror body.

DETAILED DESCRIPTION OF THE PREFERRED EMBODIMENTS

Figure 1:
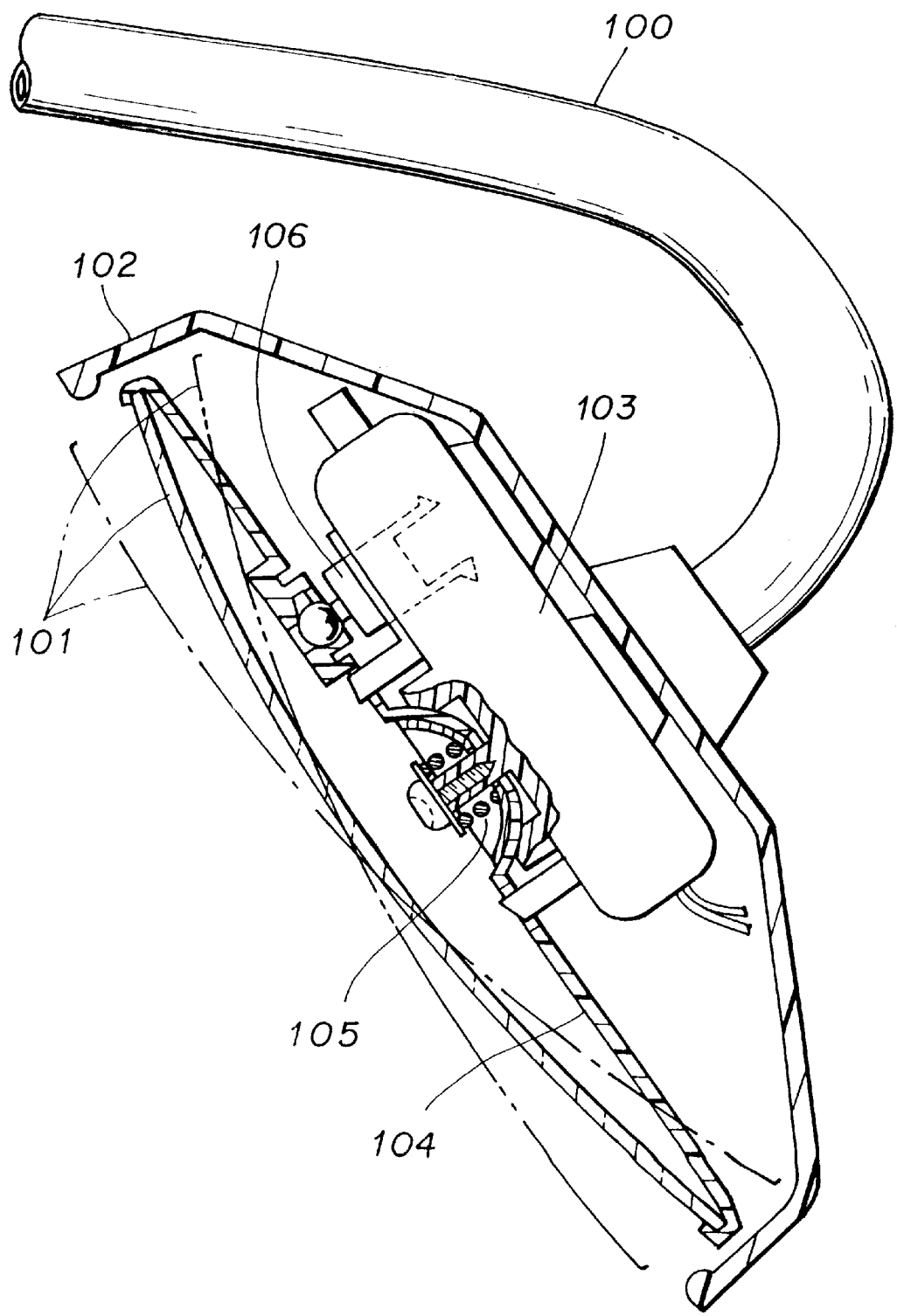
FIG. 1 is a partially cutaway view showing the remote-controlled mirror apparatus for vehicles of the prior art.

An embodiment of the remote-controlled mirror apparatus for vehicles according to the present invention will be described below with reference to FIG. 5 through FIG. 25. This is an example of application to an electrically powered and remote-controlled rear under mirror apparatus for automobiles, being mounted on the rear top of a vehicle body C such as one-box car or recreational vehicle. In the drawings, same reference numerals as those in FIG. 1 through FIG. 4 denote identical parts. By assembling components shown in the exploded perspective views of FIG. 9 through FIG. 14 along the center axis O—O, the remote-controlled mirror apparatus for vehicles according to this embodiment of the present invention is constructed.

In the drawings, reference numeral 1 denotes a stay made of a hollow tube (pipe). One end of the stay 1 is attached to a vehicle body (not shown). Mounted on the other end of the stay 1 is a mirror body 2 via a mirror holder 3 and power unit 4 (and a clutch mechanism 5 and a mirror holder base 6) to serve as an angle adjusting mechanism, mounted to be capable of adjusting the angle.

The mirror body 2 described above has a convex reflecting surface (mirror surface) of a small radius of curvature formed thereon, as shown in FIG. 5 through FIG. 7 and FIG. 9. The mirror holder 3 described above has such a configuration of housing with a front face 30 opening and a rear portion closed as shown in FIG. 5 through FIG. 7 and FIG. 13. In the front opening 30 of the mirror holder 3, a hook 31 and a plurality of ribs 32 (omitted in FIG. 13) are installed integrally with each other. Fastened by bonding (and/or other fastening means) via tape 20 between the hook 31 and the ribs 32 is the circumference of the mirror body 2. As a result, the mirror body 2 is held by the mirror holder 3 of the housing configuration.

The power unit 4 is disposed in a chamber 21 defined by the mirror body 2 and the mirror holder 3. The power unit 4 comprises two separate parts of housing 400 and 401 that are held together by screws 402, as shown in FIG. 8, FIG. 10, FIG. 11 and FIG. 15. The housing parts 400 and 401 contain two motors 41, 42, two advance-retract rods 410, 420, two sets of drive force transmission mechanisms (comprising first (worm) gears 411, 421, second gears (each comprising a helical gear of a worm wheel and a spur gear of an idle gear combined on the same shaft) 412, 422, third gears (each comprising an external-teeth gear and an internal-teeth gear integrated) 413, 423), two cross-shaped springs 414, 424 and two packings 415, 425 incorporated therein.

The two advance-retract rods 410, 420 are located on two oblique axes S1—S1, S2—S2 that are counterparts of mutually perpendicular vertical axis V—V and horizontal axis H—H rotated around the intersect thereof (center P of a pivot mechanism 63 to be described later and is the center of tilting movement of tilting members such as the mirror body 2 and the mirror holder 3) by 45 degrees, being located in parallel to the horizontal axis H—H and above the horizontal axis H—H, respectively. The vertical axis V—V, the horizontal axis H—H and the two oblique axes S1—S1, S2—S2 intersect at right angles with the center axis O—O located on one end of the stay 1 at the intersect P.

Figure 15:
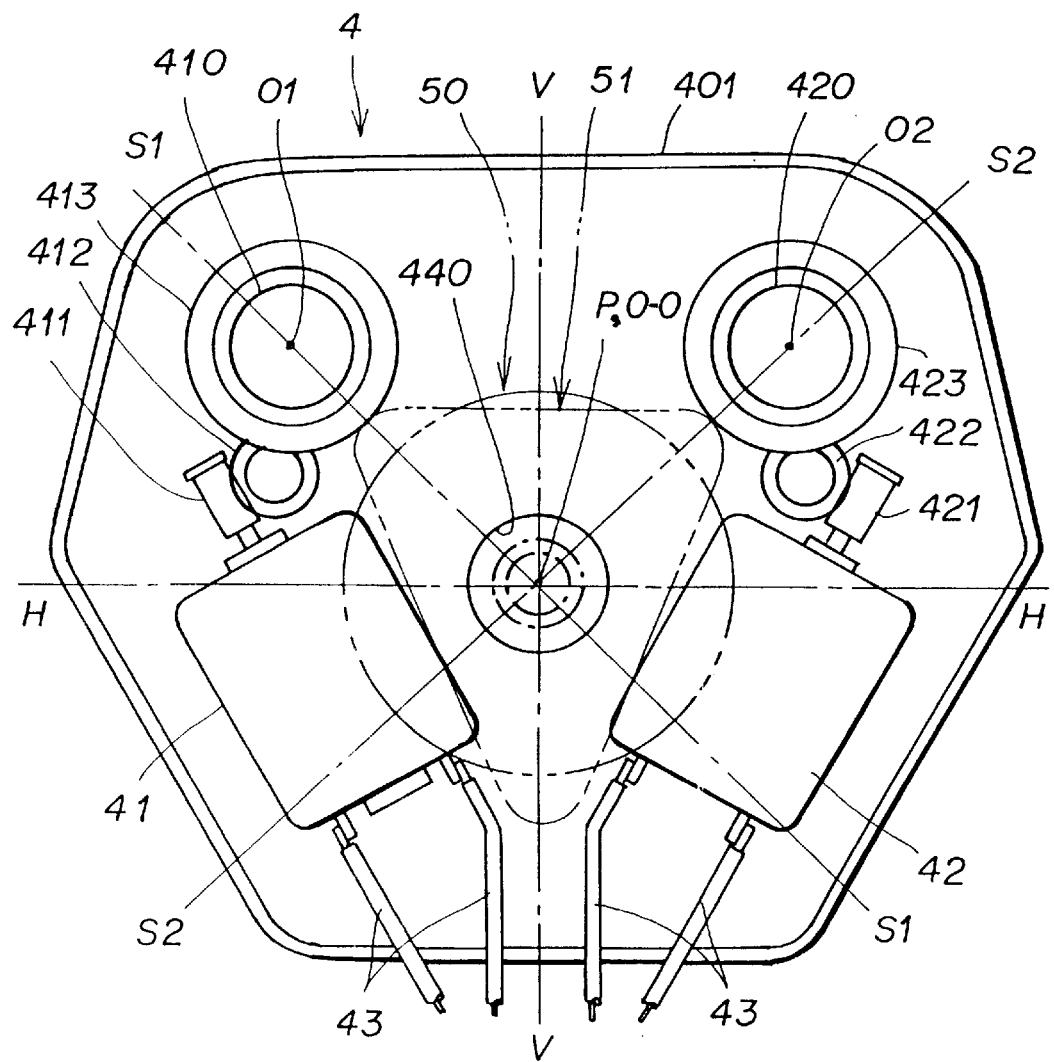
FIG. 15 is a schematic front view showing the layout of motors, advance-retract rods and drive force transmission mechanism of the power unit.

The two motors 41, 42 are disposed in V-shaped configuration that is symmetrical with respect to the vertical axis V—V as shown in FIG. 15. The two sets of drive force transmission mechanisms 411, 421, 412, 422, 413, 423, the two cross-shaped springs 414, 424 and the two packings 415, 425 are disposed substantially in the moving direction of the two advance-retract rods 410, 420.

Since the two advance-retract rods 410, 420 are located on the two oblique axes S1—S1, S2—S2 that are counterparts of the mutually perpendicular vertical axis V—V and horizontal axis H—H rotated around the intersect P, O—O by 45 degrees, being disposed in parallel to the horizontal axis H—H and above the horizontal axis H—H, respectively, thus the distances between the intersect P, O—O and the centers 01, 02 of the advance-retract rods 410, 420 can be increased to square root of 2 (approximately 1.4) times that of a case in which the two advance-retract rods are located on the vertical axis V—V and the horizontal axis H—H, given the same size of the housing 400, 401 of the power unit 4, thus increasing the holding force of the two advance-retract rods 410, 420.

Also because the two advance-retract rods 410, 420 are arranged symmetrically with respect to the vertical axis V—V, balance between the right and left portions is maintained. Further since the moving portions of the mirror body 2 and the mirror holder 3 are held by 3-point support involving the pivot mechanism 63 to be described later, the reflecting surface of the mirror body 2 can be prevented from being dislocated by impact or the like.

In the remote-controlled mirror apparatus for vehicles of this type, the center of mass of the tilting member constituted from the mirror body 2 and the mirror holder 3 and other components is preferably located at the center P of tilting movement of the tilting member for the convenience of the angle adjustment. However, when the center of mass of the tilting member and the center P of tilting movement deviate from each other, a force proportional to the amount of deviation acts on the tilting member to cause the tilting member to tilt. This tilting movement of the tilting member is prevented by the main holding effect of the pivot mechanism 63 and the subsidiary holding effect of the two advance-retract rods 410, 420 of the power unit 4. In this embodiment, since the two advance-retract rods 410, 420 are arranged symmetrically with respect to the vertical axis V—V, the subsidiary holding effects of the two advance-retract rods 410, 420 on the right and left are well balanced, so that the reflecting surface of the mirror body 2 can be surely prevented from being dislocated.

The power unit 4 has the cavity (cavity of a shaft 50 to be described later) that communicates with the cavity of the stay 1, as shown in FIG. 5 through FIG. 8. The cable harness 43 connected to the two motors 41, 40 is led out of the housing 400, 401 of the power unit 4 in the chamber 21 that is defined by the mirror body 2 and the mirror holder 3, passed through the cavity (cavity of the shaft 50 to be described later) of the power unit 4 and the cavity of the stay 1 as shown in FIG. 5 through FIG. 8, and is electrically connected to a power source (not shown).

Since the cable harness 43 is passed through the cavity of the power unit 4 and the cavity of the stay 1 in the chamber 21 as described above, the cable harness 43 does not run outside the chamber 21 unlike such a case as the cable harness is drawn out of the mirror holder 3 (mirror housing) for connection, thus resulting in better appearance. Also because the assembly work is easier for passing the cable harness 43 through the cavity of the power unit 4 and the cavity of the stay 1 in the chamber 21 and the cable harness 43 is not led outside the chamber 21, sealing performance is improved.

Moreover, in the case of the remote-controlled mirror apparatus for vehicles according to the present invention wherein the mirror body 2 and the mirror holder 3 that house the power unit 4 tilt with respect to the power unit 4 and the stay 1, since the cable harness 43 is wired in the chamber 21 defined by the mirror body 2 and the mirror holder 3, tilting motion of the mirror body 2 and the mirror holder 3 can be done smoothly. This effect is particularly remarkable when the cable harness 43 passes through the center P of tilting movement of the mirror body 2 and the mirror holder 3.

Figure 8:
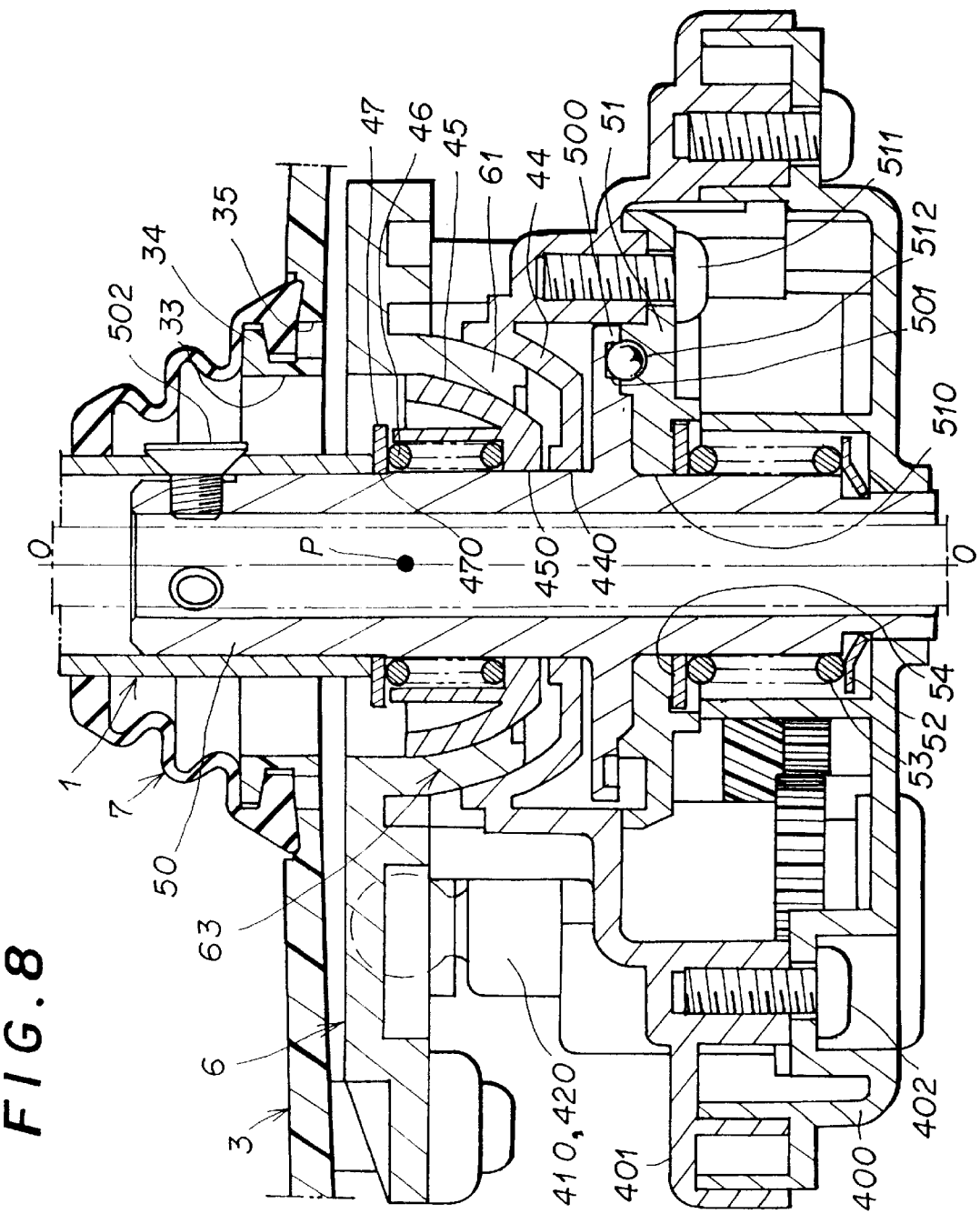
FIG. 8 is a partially cutaway view showing the power unit, the mirror holder base and other components.
Figure 9:
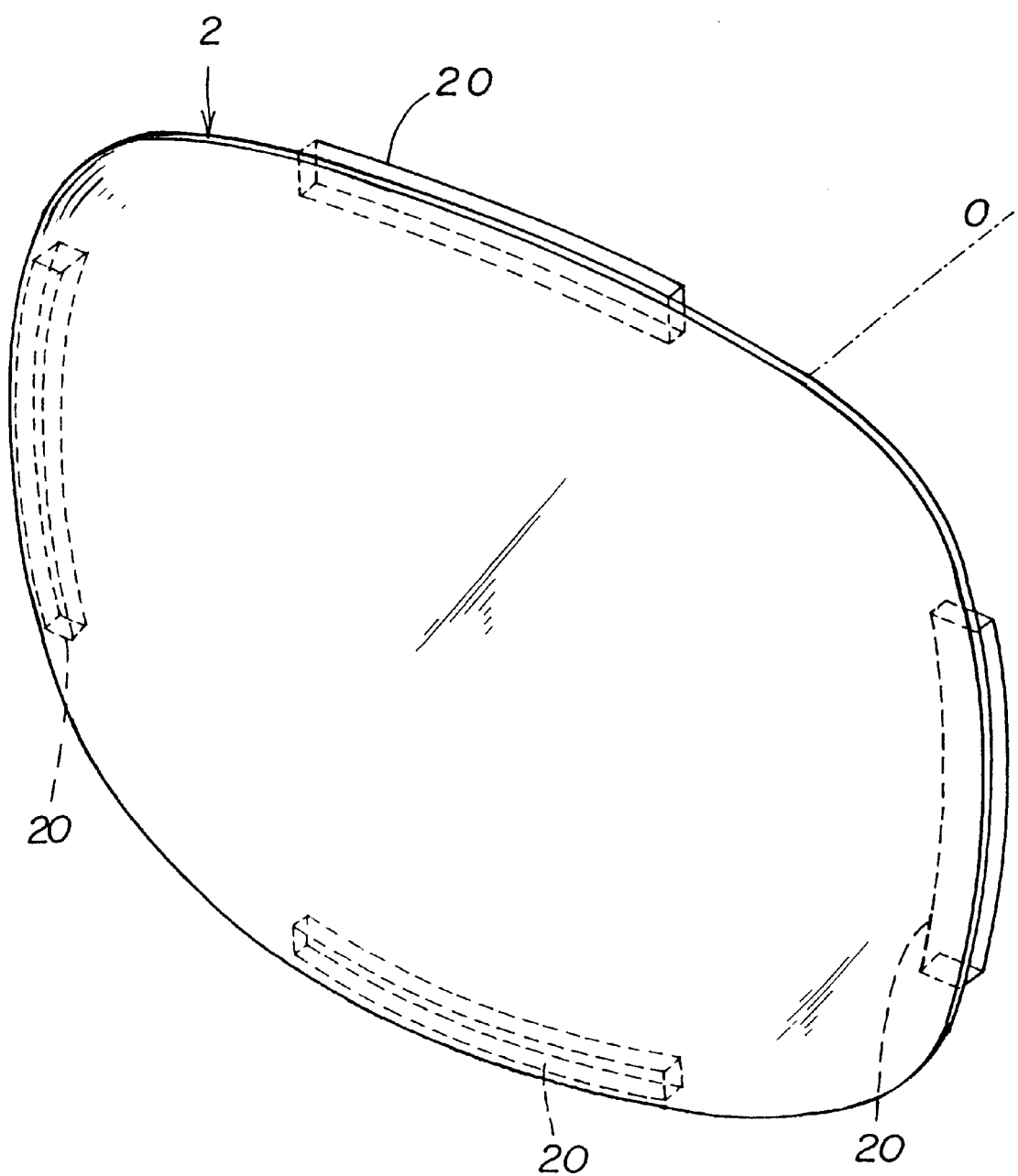
FIG. 9 is an exploded perspective view showing the mirror body.
Figure 10:
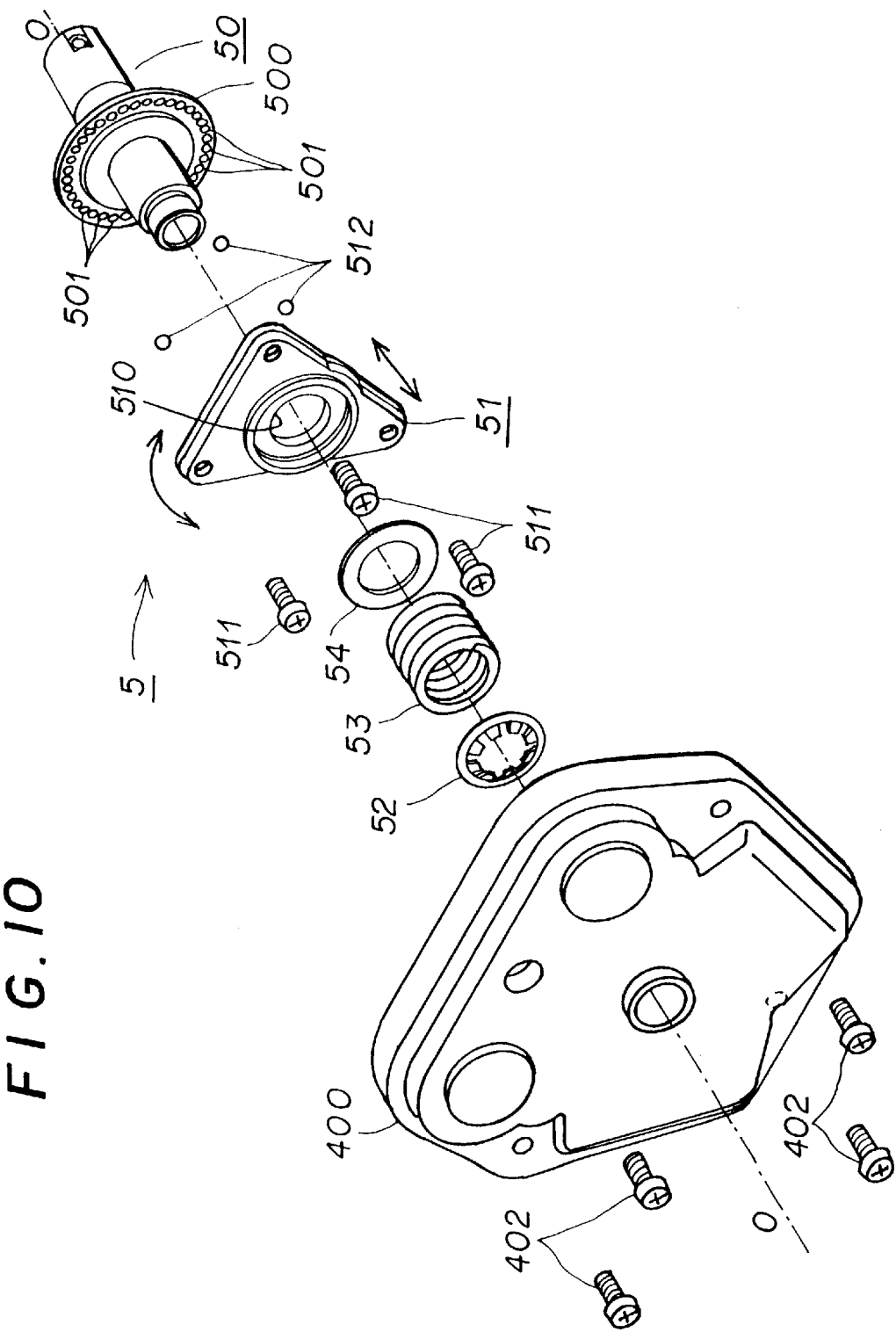
FIG. 10 is an exploded perspective view showing a part of the power unit and the clutch mechanism.
Figure 11:
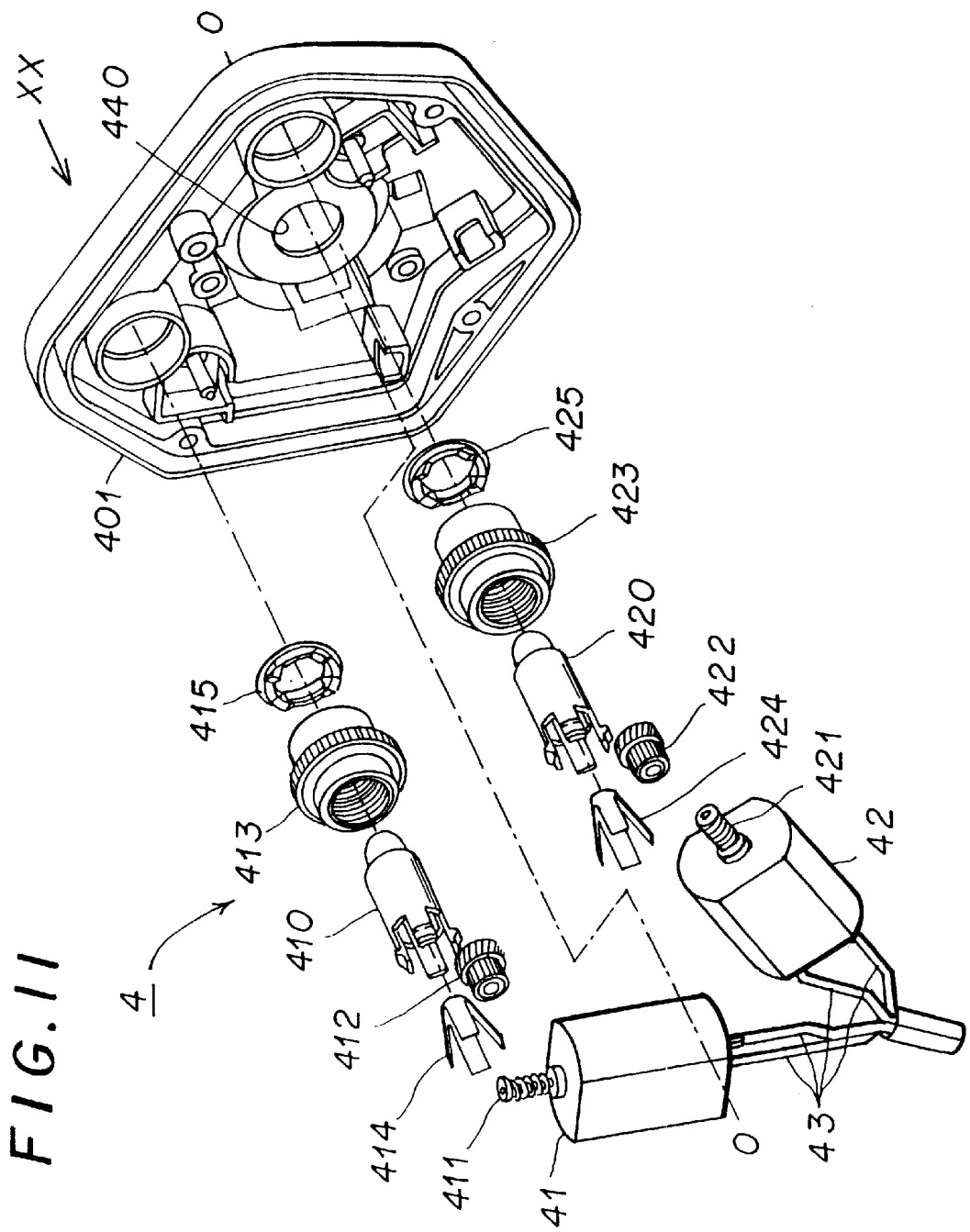
FIG. 11 is an exploded perspective view showing a key portion of the power unit.
Figure 12:
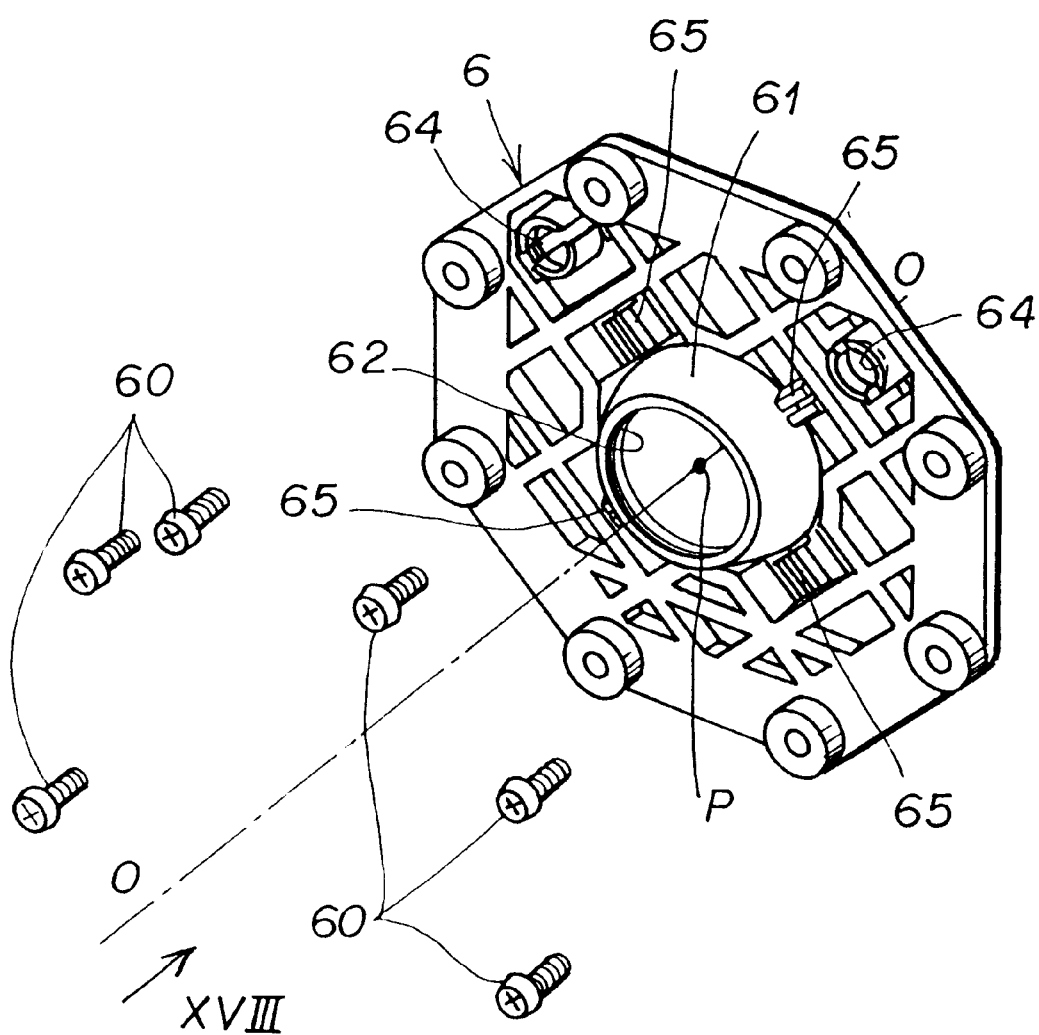
FIG. 12 is an exploded perspective view showing the mirror holder base.
Figure 13:
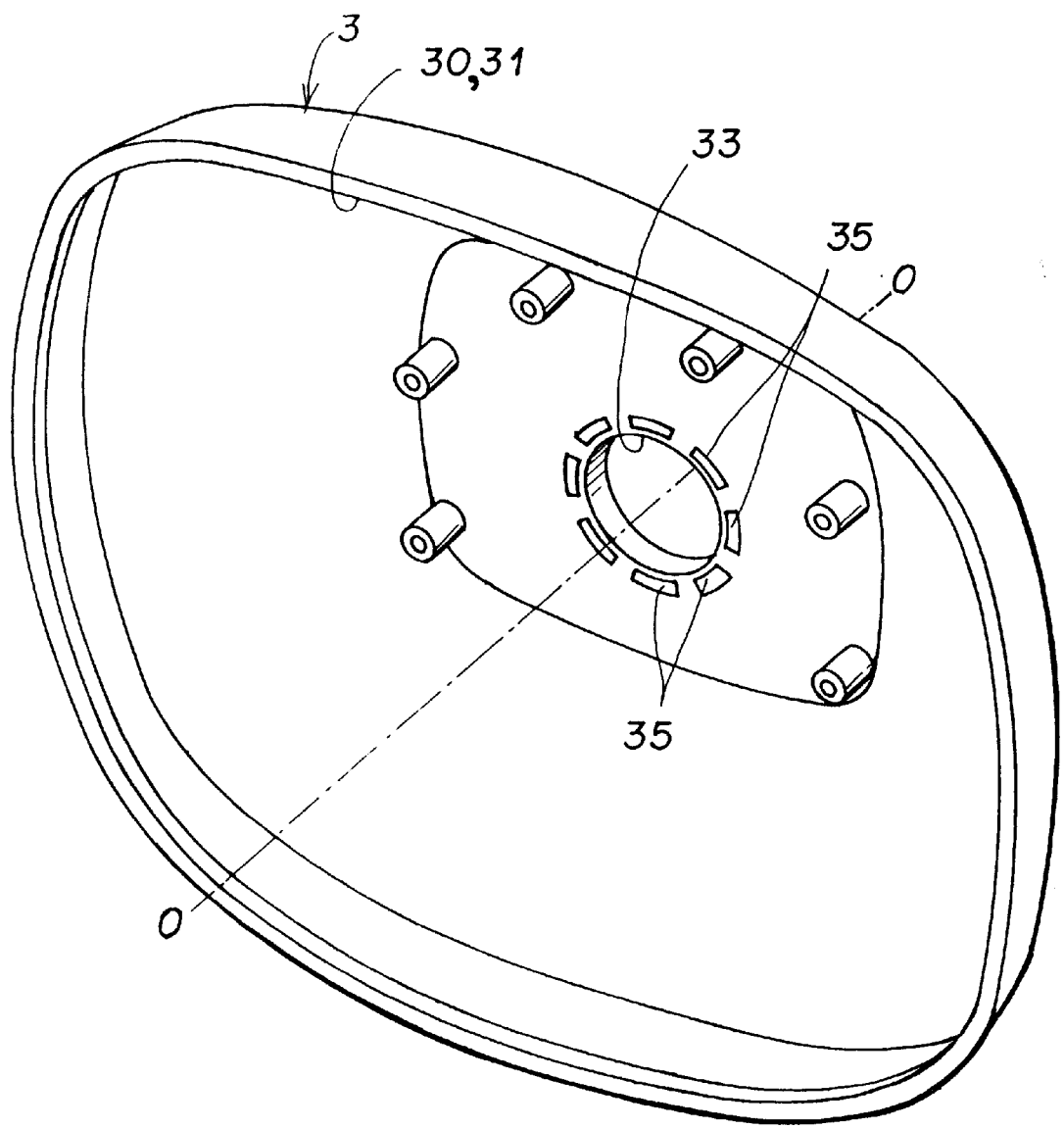
FIG. 13 is an exploded perspective view showing the mirror holder.
Figure 16:
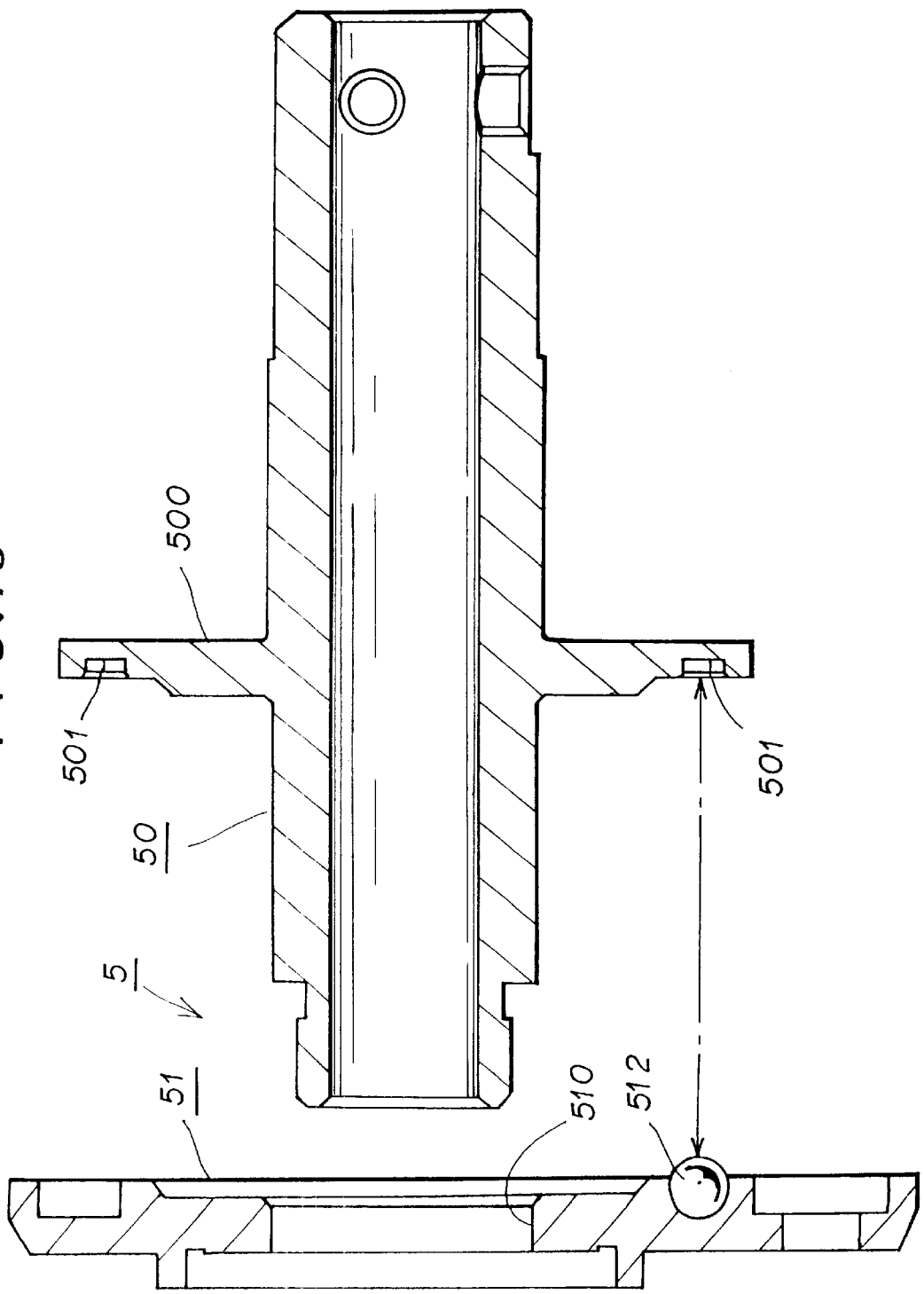
FIG. 16 is an exploded sectional view showing the notch type clutch mechanism.

The power unit 4 is attached to one end of the stay 1 to be rotatable around the center axis O—O on the one end of the stay 1 via the clutch mechanism 5 as shown in FIG. 8 and FIG. 10. The clutch mechanism 5 has the shaft 50 that is fixed on the stay 1 side and a bracket 51 fixed on the power unit 4 side, as shown in FIG. 8, FIG. 10 and FIG. 16.

The shaft 50 is separated from the stay 1 as shown in FIG. 8, and comprises a hollow cylindrical tube that is smaller than the stay 1, with a disk 500 being attached integrally in an intermediate portion thereof. The disk 500 has small round recesses 501 arranged one on another on one side of the disk (opposite side of the stay 1) along the circumference thereof. One end of the shaft 50 is inserted into one end of the stay 1 and fastened by, for example, three screws 502 as a tightening fixture. The other end of the shaft 50 and the disk 500 are housed in the housing 400, 401 of the power unit 4, while the other end of the shaft 50 further penetrates through the housing 400, 401 of the power unit 4. Besides, center axis of the shaft 50 and the center axis O—O on the other end of the stay 1 correspond with each other, and the cable harness 43 passes through the shaft 50 and the stay 1.

The above mentioned bracket 51 has a shape of triangular plate as shown in FIG. 10, and has a round through hole 510 at the center thereof. The bracket 51 is fitted to the other end of the shaft 50 via the through hole 510 to be rotatable about the center axis O—O (in the direction of arc arrow in FIG. 10) and movable in the direction of the center axis O—O (in the direction of straight arrow in FIG. 10), and is fastened on the housing 401 of the power unit 4 by means of screws 511. The bracket 51 has, for example, three small balls (steel balls) 512 embedded at equal intervals on one side (surface that opposes the disk 500 of the shaft 50) thereof, corresponding to the group of recesses 501 of the shaft 50.

Also as shown in FIG. 8 and FIG. 10, a bushing nut 52 is fastened on the other end of the shaft 50. Installed between the bushing nut 52 and the bracket 51 are a compressive coil spring 53 and a washer 54. Elastic force of the spring 53 presses the bracket 51 against the disk 500 of the shaft 50, thereby fitting the balls 512 into the recesses 501. As a result, the power unit 4 is mounted on the other end of the stay 1 via the clutch mechanism 5 to be rotatable about the center axis O—O.

Since the power unit 4 is mounted on the other end of the stay 1 via the clutch mechanism 5 to be rotatable about the center axis O—O on the other end of the stay 1, the mirror body 2 and the other components can be rotated about the center axis O—O on the other end of the stay 1 with respect to the stay 1 via the power unit 4 and the clutch mechanism 5, thereby providing such effects as increasing the scope of use. In other words, angle of the mirror body 2 is adjusted through remote control thereby changing the viewing direction, and the mirror body 2 can also be rotated about the center axis O—O on the other end of the stay 1. Consequently, the field in which objects can be viewed and perceived can be changed, making it possible to view over a wider range.

Specifically, the mirror body 2, the mirror holder 3, the power unit 4 and the other components are rotated about the center axis O—O on the other end of the stay 1 with respect to the stay 1 against the elastic force of the spring 53. This causes the balls 512 on the bracket 51 side to get out of the recesses 501 on the shaft 50 side. Accordingly, the bracket 51 slides in the direction of the center axis O—O of the stay 1 against the elastic force of the spring 53. When the balls 512 have got out of the recesses 501, the mirror body 2 and the other components rotate about the center axis O—O on the other end of the stay 1 with respect to the stay 1.

When rotation of the mirror body 2 and the other components is stopped, the elastic force of the spring 53 causes the bracket 51 to slide in the direction of the center axis O—O of the stay 1, thus making the balls 512 fitted in the recesses 501 again, so that the power unit 4 and the stay 1 side are held together.

In the case of the clutch mechanism 5 of the notch type, the holding force is large and such an effect is provided as click feeling can be obtained in the operation.

Figure 17:
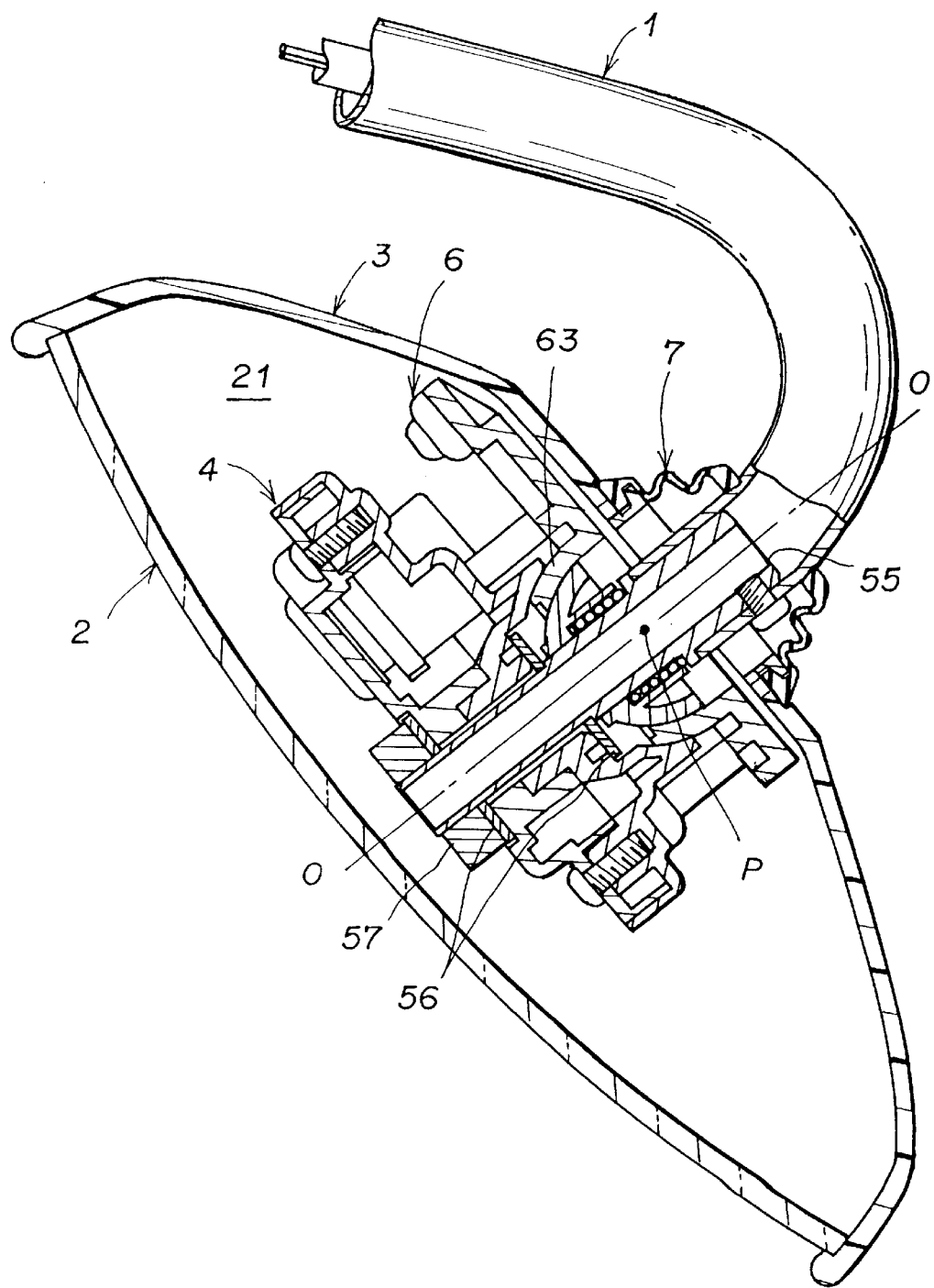
FIG. 17 is a partially cutaway view showing the friction type clutch mechanism.

FIG. 17 is a partially cutaway view showing a clutch mechanism of friction type. In the drawings, same reference numerals as those in FIG. 1 through FIG. 16 denote identical parts.

The clutch mechanism of friction type has such a configuration as one end of a shaft 55 of hollow tube shape is inserted in the other end of the stay 1 and is fastened by screws or the like. The other end of the shaft 55 penetrates through the housing of the power unit 4. Fastened integrally on the other end of the shaft 55 are two friction plates 56 (fixed to be incapable of rotating with respect to the shaft 55). Held by pressure between the two friction plates 56 is the housing of the power unit 4 to be rotatable about the center axis O—O of the stay 1. Assembled on the other end of the shaft 55 is a tightening fixture 57 such as nut so that the two friction plates 56 press and hold the housing of the power unit 4.

The clutch mechanism of friction type is capable of achieving an effect similar to that of the clutch mechanism 5 of notch type and, in addition, has an effect of rotating the mirror body 2 and the other components in a stepless way.

Figure 14:
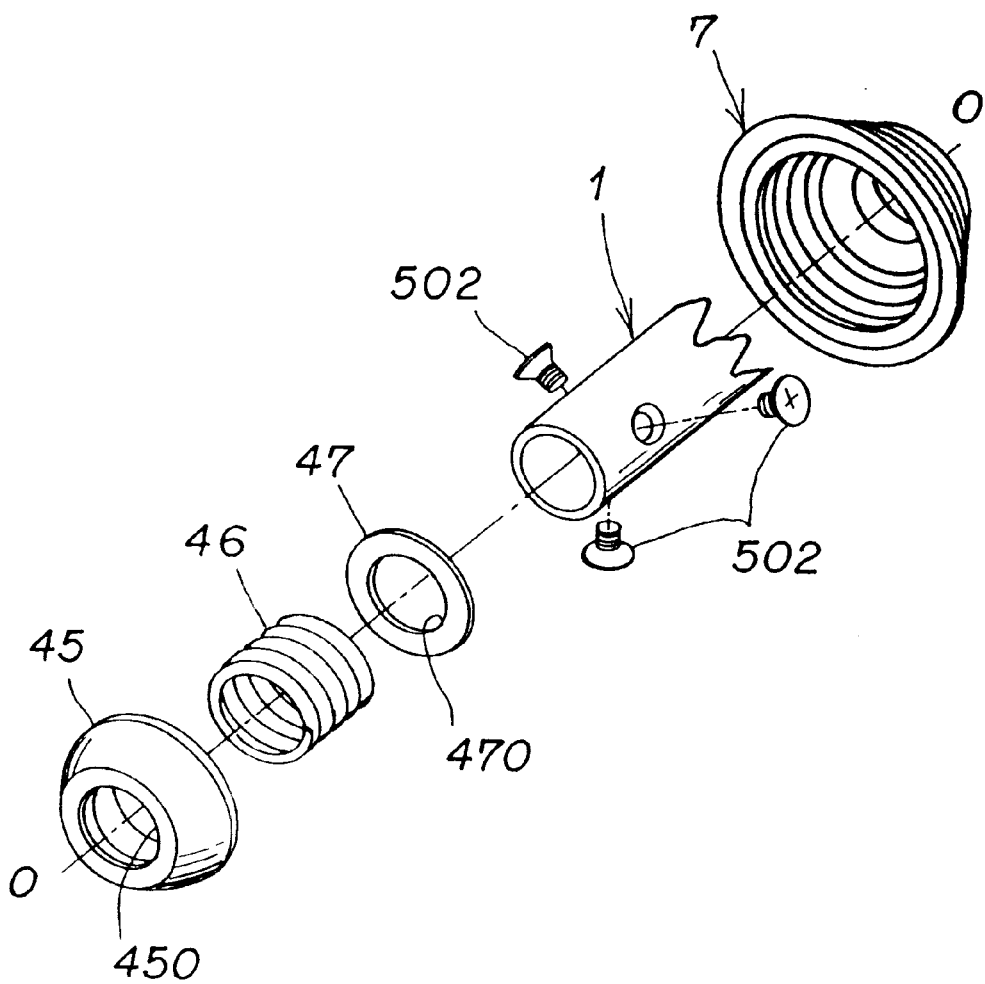
FIG. 14 is an exploded perspective view showing the stay, part of the pivot mechanism and the waterproof boot.

The shaft 50 on the mirror body 2 side and the stay 1 are divided as shown in FIG. 8, FIG. 10 and FIG. 14 and are fastened together by screws 502 as a tightening fixture, and therefore there is such effects as the mirror body 2 side (mirror holder 3, power unit 4, etc.) and the stay 1 side are shared, freely selected and replaced. When the mirror body 2 is broken, for example, only the mirror body 2 may be replaced without need to replace the stay 1 side. Also it is easy to manufacture products by forming only the stay 1 in a desired shape, thus improving the productivity and serviceability.

The mirror holder 3 that holds the mirror body 2 is attached to the power unit 4 that is installed on the stay 1 as described above, to be capable of adjusting the angle by means of the pivot mechanism 63, as shown in FIG. 8, FIG. 10 and FIG. 14. Fastened with screw 60 on the rear inner surface of the mirror holder 3 is the mirror holder base 6. A spherical portion 61 is provided integrally at the center of the mirror holder base 6. Provided at the center on the back of the spherical portion 61 and the mirror holder 3 are round through holes 62 and 33, that have inner diameters greater than the outer diameters of the stay 1 and the shaft 50, respectively. Inserted in the through hole 33 of the mirror holder 3 and in the through hole 62 of the mirror holder base 6 are the other end of the stay 1 and one end of the shaft 50, respectively.

Provided integrally at the center of the housing 401 of the power unit 4 is a spherical recess 44. The spherical recess 44 of the power unit 4 has the spherical portion 61 of the mirror holder base 6 attached thereto, in such a way as the angle can be adjusted by means of a spherical convex washer 45, a compressive coil spring 46 and a plain washer 47. The plain washer 47 is pressed against the other end face of the stay 1 by the elastic force of the spring 46 that is interposed between the spherical convex washer 45 and the plain washer 47 thereby to receive the resisting force, while the spherical convex washer 45 presses the spherical portion 61 of the mirror holder base 6 against the spherical recess 44 of the power unit 4. As a result, the spherical portion 61 of the mirror holder base 6 is pressed and held between the spherical convex washer 45 and the spherical recess 44 of the power unit 4 in such a way as the angle can be adjusted, and the mirror holder 3 is mounted on the power unit 4 to be capable of adjusting the angle. Further, one end of the shaft 50 is inserted through the through hole 440 of the spherical recess 4, the through hole 450 of the spherical convex washer 45, the compressive coil spring 46 and the through hole 470 of the plain washer 47.

The spherical recess 44 of the power unit 4, the spherical portion 61 of the mirror holder base 6, the spherical convex washer 45, the spring 46 and the plain washer 47 constitute the pivot mechanism 63. Center (centers of the spherical recess 44, the spherical portion 61 and the spherical convex washer 45) P of the pivot mechanism 63 is located near the through hole 33 of the mirror holder 3 through which the other end of the stay 1 is inserted.

By locating the center P of the pivot mechanism 63 near the through hole 33 of the mirror holder 3 through which the other end of the stay 1 is inserted as described above, movement of the edge of the through hole 33 of the mirror holder 3 decreases when the mirror body 2, the mirror holder 3, etc. are tilted, thus making it possible to decrease the diameter of the through hole 33, and decrease the size of a waterproof boot 7 to be described later, thereby obtain the well-designed waterproof boot 7. Also because movement of the waterproof boot 7 can be made smaller, such effects are obtained as less resistance against the movement of the waterproof boot 7 and better operability of the power unit 4.

Figure 18:
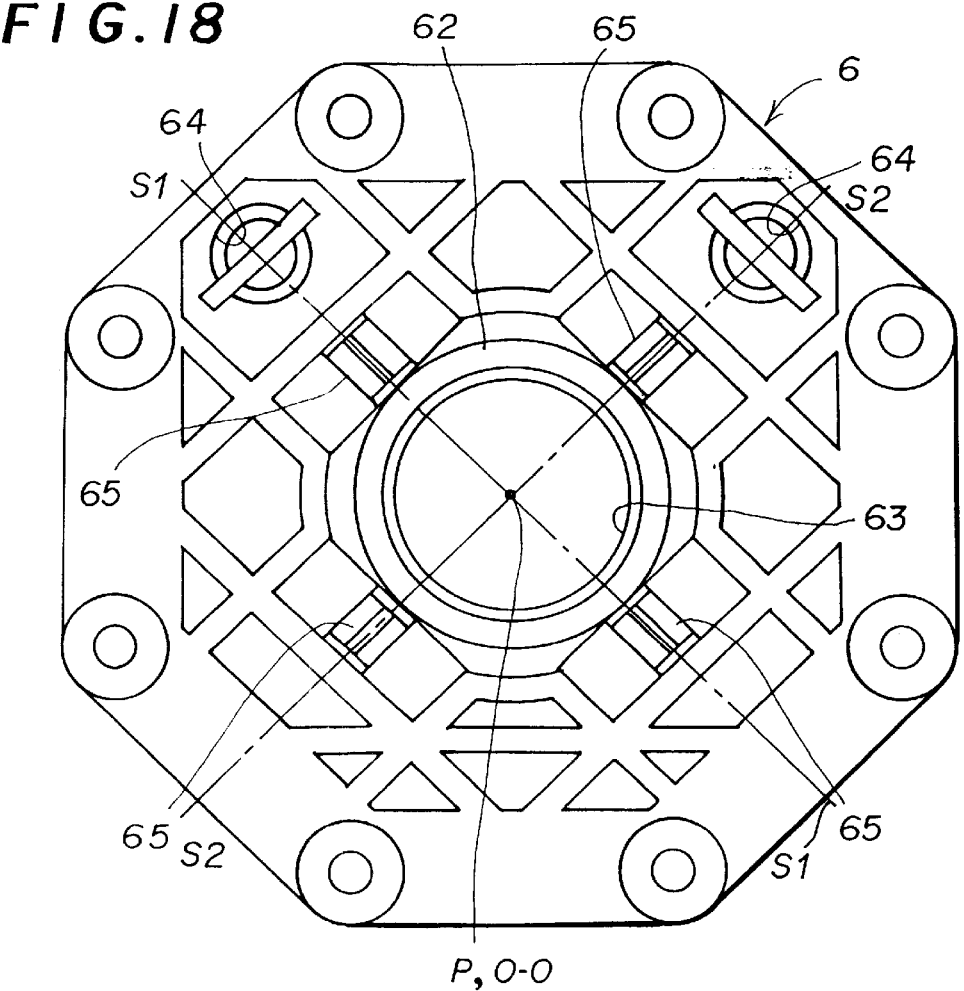
FIG. 18 is a view in the direction of XVIII in FIG. 12.
Figure 19:
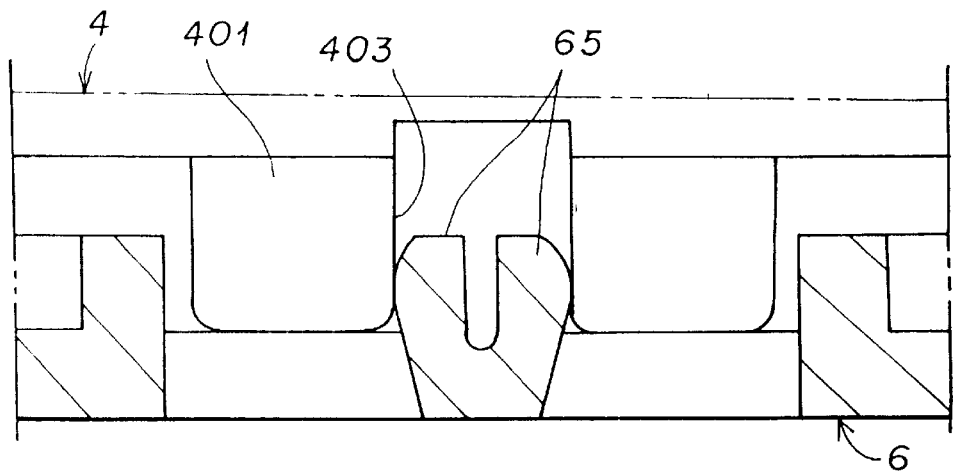
FIG. 19 is a partially cutaway view showing the elastic fitting of the guiding projection and the guiding recess.

The above mentioned mirror holder base 6 has two spherical recesses 64 to which the spherical portions of the two advance-retract rods 410, 420 of the power unit 4 are fitted rotatably as shown in FIG. 18 and FIG. 19. Two elastic projections 65 having cylindrical configuration (round pin)

and forked cross section are provided on each of the two oblique axes (axes connecting the center P of the pivot mechanism 63 and the centers of the two spherical recesses 64 (or spherical portions of the two advance-retract rods 410, 420)) S1—S1, S2—S2 of the mirror holder base 6.

Figure 20:
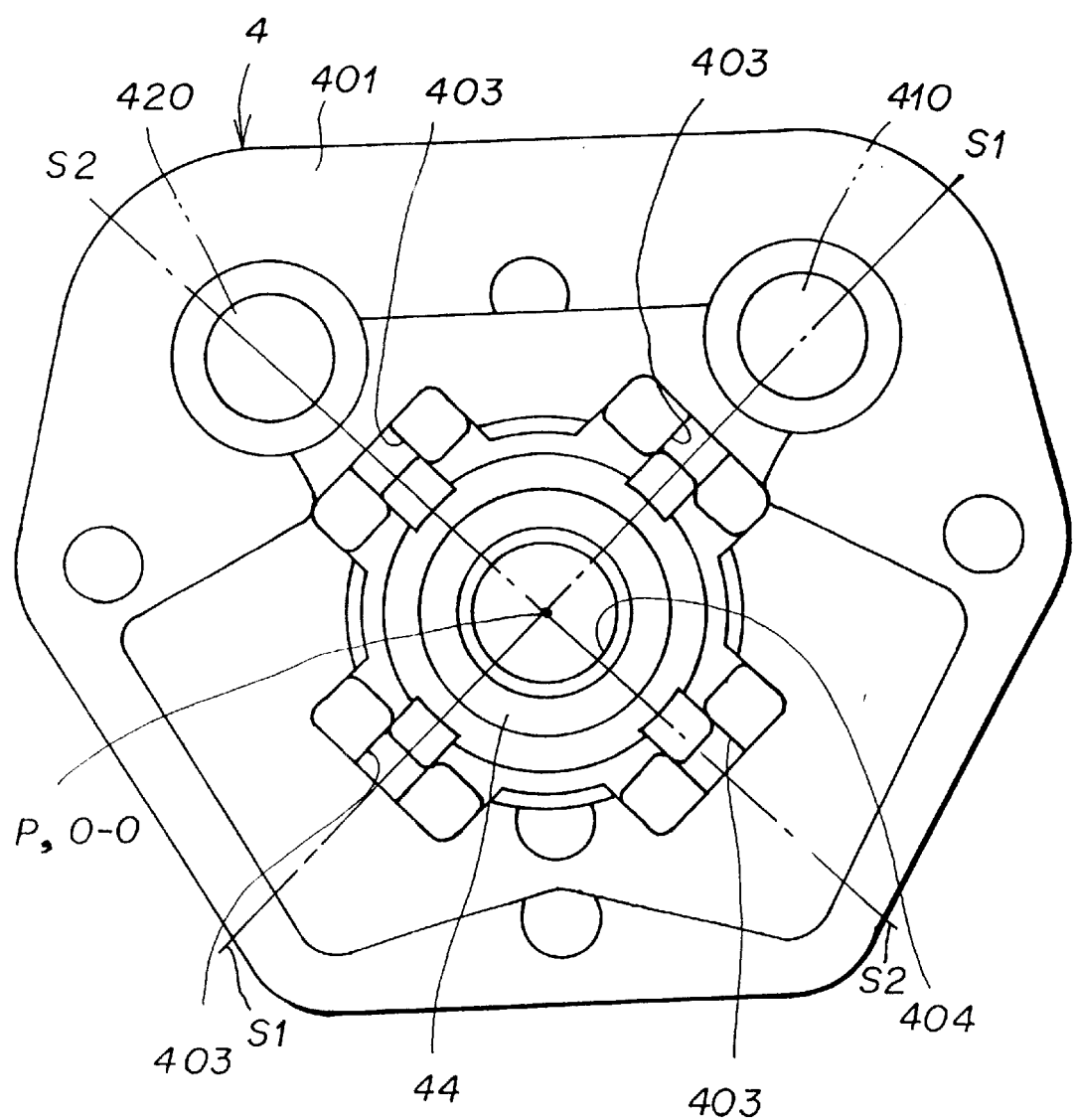
FIG. 20 is a view in the direction of XX in FIG. 11.

Also provided on the two oblique axes S1—S1, S2—S2 of the housing 401 of the power unit 4 are four guiding recesses 403 having cylindrical concave shape corresponding to the four elastic guiding projections 65, as shown in FIG. 20.

The elastic guiding projection 65 of the mirror holder base 6 and the guiding recess 403 of the power unit 4 are elastically fitted to each other. As the advance-retract rods 410, 420 of the power unit 4 are moved forward or backward by the elastic guiding projection 65 of the mirror holder base 6 and the guiding recess 403 of the power unit 4 which are elastically fitted to each other, tilting motion of the tilting member comprising the mirror holder base 6, the mirror body 2, etc. is guided (positioned).

Since the guiding projection 65 is made in forked cross section and has elasticity in the direction that crosses the two oblique axes S1—S1, S2—S2, elastic fitting of the guiding projection 65 having the forked cross section and the guiding recess 403 brings the outer surface of the guiding projection 65 and the inner surface of the guiding recess 403 into contact with each other while pressing, thus preventing play of the guiding projection 65 from occurring in the direction that crosses the two oblique axes S1—S1, S2—S2, thereby making it possible to guide the tilting movement of the tilting members without play.

Figure 21:
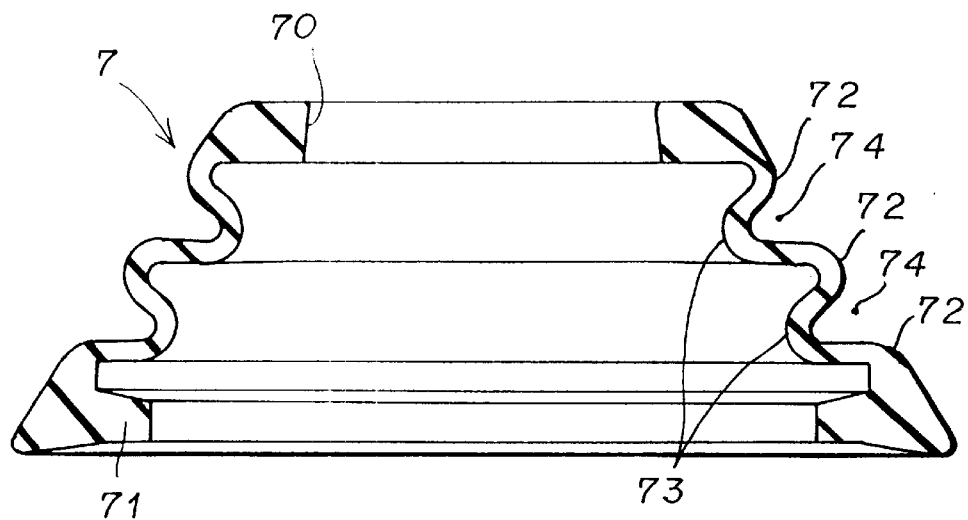
FIG. 21 is a sectional view showing the waterproof boot.
Figure 22:
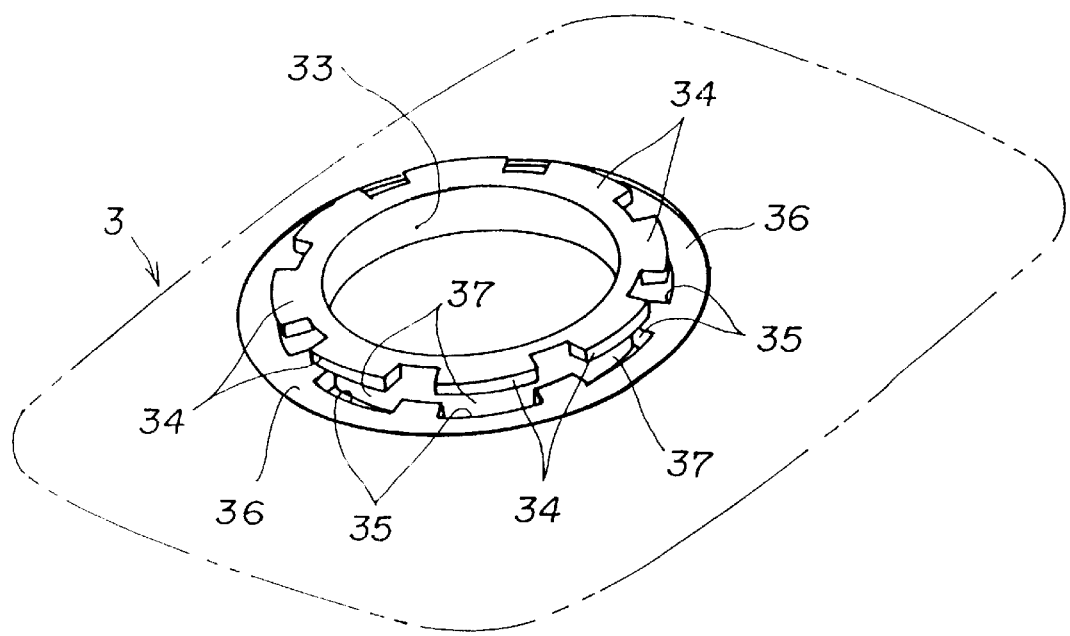
FIG. 22 is a partial perspective view showing the through hole and the engagement lips of the mirror holder.

In the drawings, reference numeral 7 denotes the waterproof boot. The waterproof boot 7 has a configuration of bellows having annular projections 72 and annular recesses 73 arranged alternately, while the diameter increases gradually from one end to the other in a conical trapezoidal shape. When the waterproof boot 7 is fastened on the stay 1 and on the circumference 36 of the through hole 33 of the mirror holder 3, part of an opening 74 between adjacent annular projections 72 faces downward so that water does not build up on a part of the annular recess 73 that faces upward, One end of the waterproof boot 7 is fastened on one end of the stay 1 on the fixed side thereof (may also be fastened via a fastening ring (not shown)) as shown in FIG. 8, FIG. 14 and FIG. 21. The other end of the waterproof boot 7 is held and fastened (or fastened by elastic holding) by a plurality of engaging lips 34 on the circumference 36 of the through hole 33 of the mirror holder 3 on the movable side thereof, to be interposed between the stay 1 and the mirror holder 3, thereby providing waterproof therebetween.

A through hole 70 on one end of the waterproof boot 7 has inner diameter a little smaller than or nearly equal to the outer diameter of the stay 1. Thus one end of the waterproof boot 7 is fastened on the stay 1 (may also be fastened via a fastening ring).

An engagement projection 71 is provided to protrude from the inner circumference of the through hole on the other end of the waterproof boot 7, integrally therewith. The engagement projection 71 is held (or fastened by elastic holding) between the circumference 36 of the through hole 33 of the mirror holder 3 and the plurality of engaging lips 34.

The engaging lips 34 are arranged to oppose the circumference 36 of the through hole 33 with a clearance (clearance for inserting the engagement projection 71 of the waterproof boot 7 by pressure) being kept therebetween. Reference numeral 35 denotes a through hole for releasing a die to form the engaging lips 34.

Since a part of the opening 74 between the adjacent annular projections 72 faces downward so that water does not build up on a part of the annular recess 73 facing upward when both ends of the waterproof boot 7 are fastened on the stay 1 and on the circumference 36 of the through hole 33 of the mirror holder 3, water or rain falling on the waterproof boot 7 is discharged through the opening 74 that faces downward between the annular projections 73 to the outside, and therefore does not build up on the part of the annular recess 73 facing upward. Since water can be surely prevented from building up on the waterproof boot 7 as described above, such problems caused by water buildup on the waterproof boot 7 can be prevented as the water staying on the waterproof boot 7 freezes and hinders smooth tilting motion of the tilting member comprising the mirror body 2 and the mirror holder 3, or operation of the power unit 4 is affected in the case of the remote-controlled mirror apparatus for vehicles of the invention where the tilting member is tilted by the power unit 4.

Figure 24:
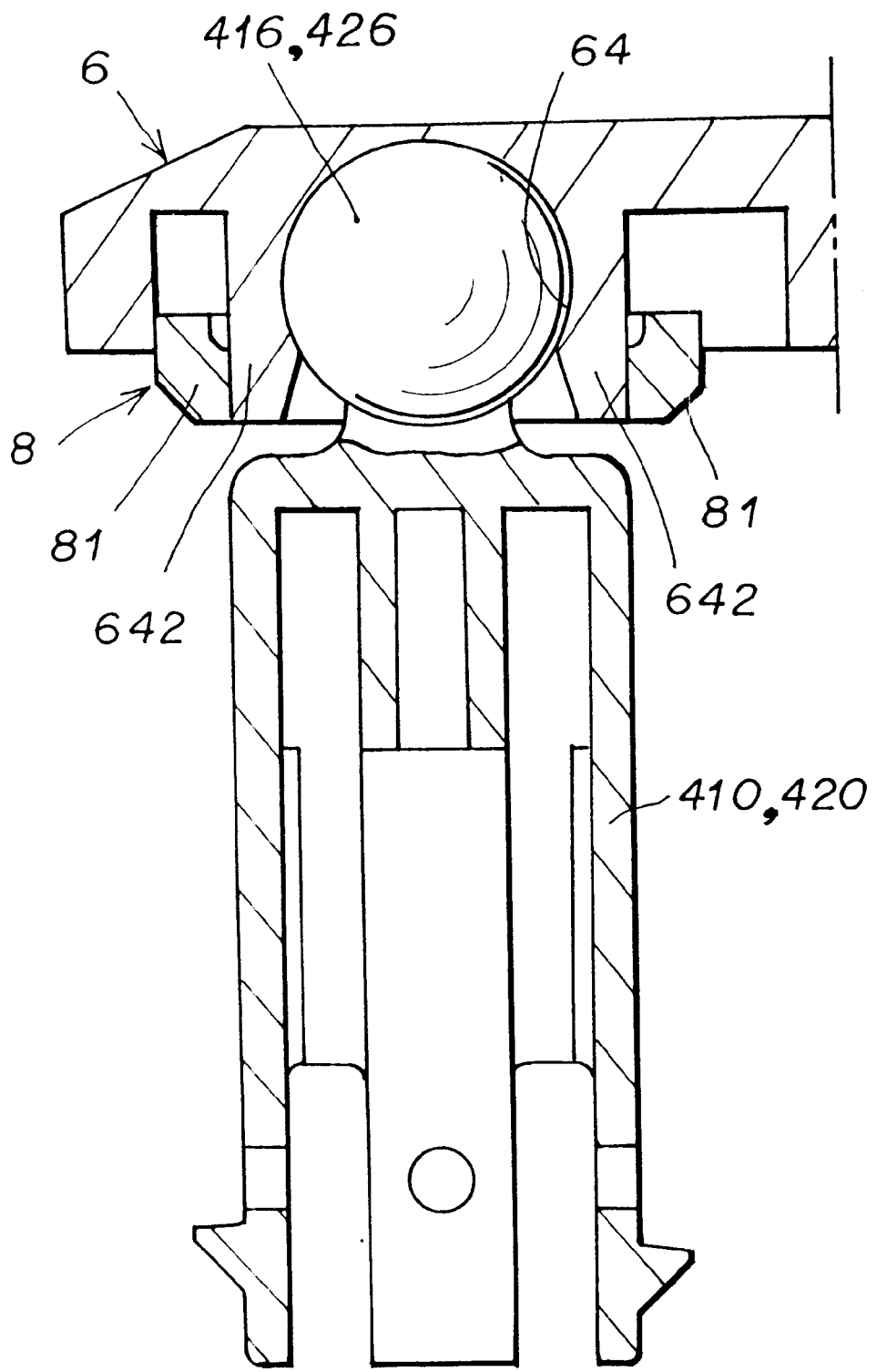
FIG. 24 is a partially cutaway view corresponding to the section along line B—B in FIG. 23A, showing the state of the spherical portion of the advance-retract rod being fitted in the spherical recess of the mirror holder base via the separate piece.
Figure 25:
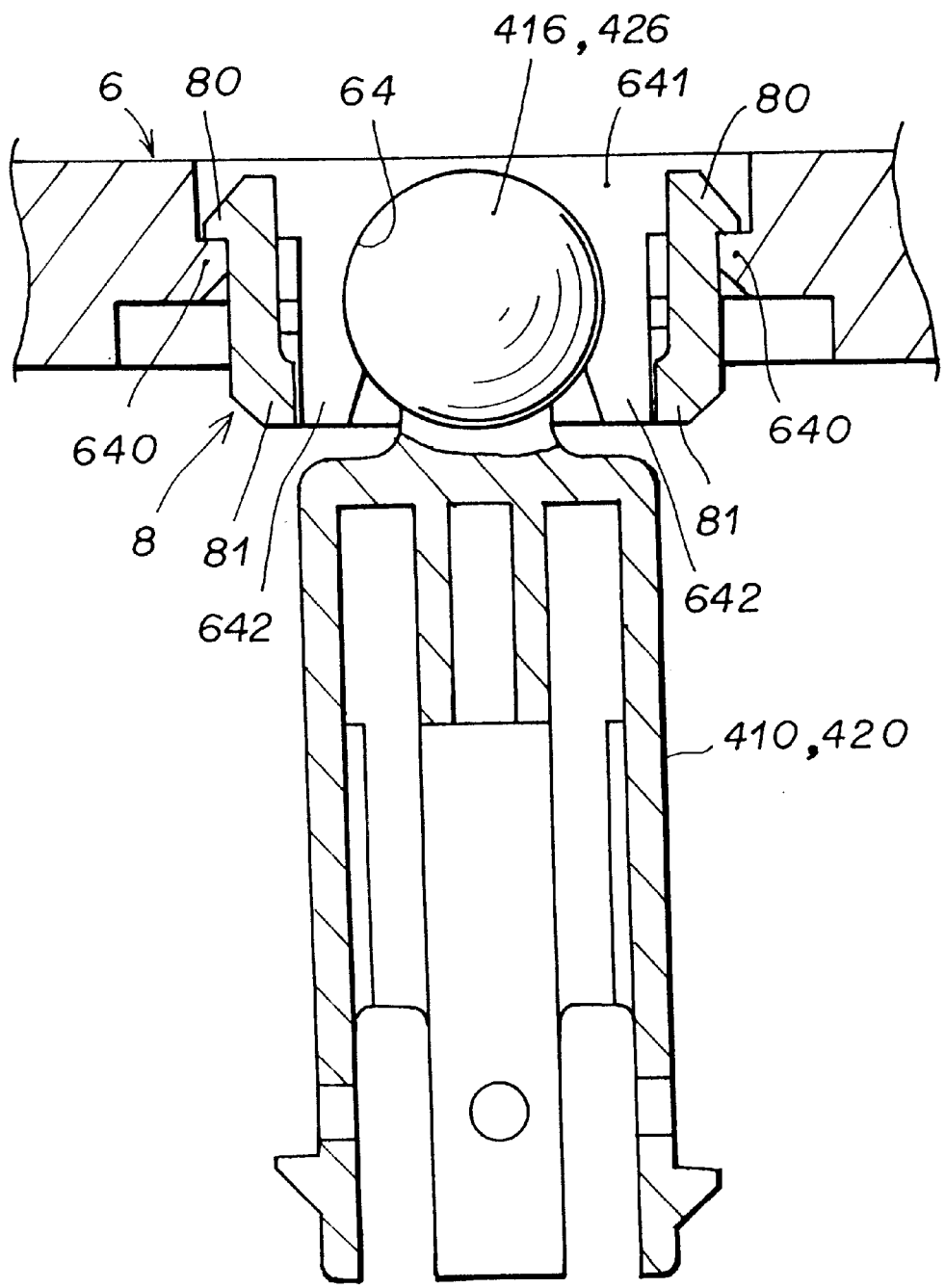
FIG. 25 is a partially cutaway view corresponding to the section along line C—C in FIG. 23A, showing the state of the spherical portion of the advance-retract rod being fitted in the spherical recess of the mirror holder base via the separate piece.

As shown in FIG. 24 and FIG. 25, the mirror holder base 6 has two cylindrical portions 642, 642 each of which has two spherical recesses 64, 64 provided thereon. Fitted rotatably to the two spherical recesses 64, 64 are the spherical portions 416, 426 of the two advance-retract rods 410, 420 of the power unit 4 via a separate piece 8 to be described later. The two spherical recesses 64, 64 are formed by undercut and have slits 641 provided in the radial direction, with two engaging steps 640, 640 provided on the edge of the slit 641.

Figure 23A:
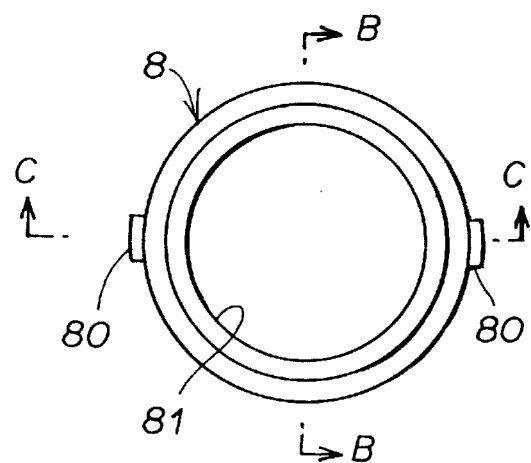
FIG. 23A is a plan view of the separate piece.
Figure 23B:
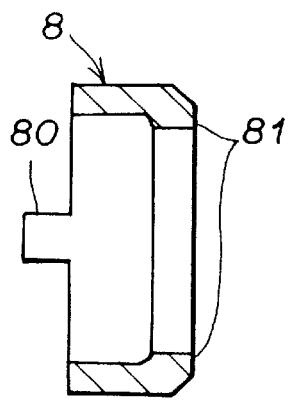
FIG. 23B is a view showing the section along line B—B in FIG. 23A.
Figure 23C:
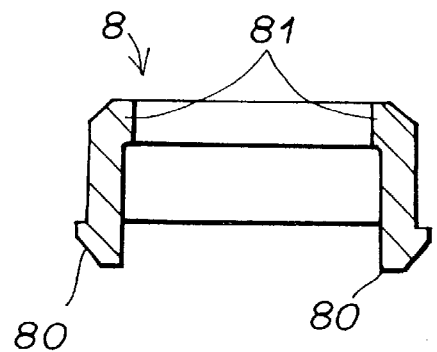
FIG. 23C is a view showing the section along line C—C in FIG. 23A.

In FIG. 23 through FIG. 25, reference numeral 8 denotes a separate piece that makes it easy to press the spherical portions 416, 426 of the two advance-retract rods 410, 420 into the spherical recesses 64, 64 and makes it difficult for the spherical portions 416, 426 of the two advance-retract rods 410, 420 to come off the spherical recesses 64, 64. The separate piece 8 is made of, for example, an elastic material such as a synthetic resin and is formed in a substantially ring shape, comprising two elastic engagement hooks 80, 80 that make elastic engagement with the two engaging steps 640, 640 of the mirror holder base 6 and a ring-shaped retainer portion 81 that prevents the spherical recesses 64, 64 (cylindrical portions 642, 642) to which the spherical portions 416, 426 of the two advance-retract rods 410, 420 are fitted from expanding outward.

The spherical portions 416, 426 of the two advance-retract rods 410, 420 are pressed to fit into the spherical recesses 64, 64, the elastic engagement hooks 80, 80 of the separate piece 8 are put into elastic engagement with the two engaging steps 640, 640 of the mirror holder base 6, and the retainer portion 81 of the separate piece 8 is pressed into the cylindrical portion 642 of the mirror holder base 6. Thus the separate piece 8 makes it easy to press the spherical portions 416, 426 of the two advance-retract rods 410, 420 into the spherical recesses 64, 64 and makes it difficult for the spherical portions 416, 426 of the two advance-retract rods 410, 420 to come off the spherical recesses 64, 64.

Since the mirror holder base 6 (mirror holder 3) is provided with the separate piece 8 that makes it easy to press the spherical portions 416, 426 of the two advance-retract rods 410, 420 into the spherical recesses 64, 64 and makes it difficult for the spherical portions 416, 426 of the two advance-retract rods 410, 420 to come off the spherical recesses 64, 64 as described above, such a configuration is made by means of the separate piece 8 that makes it easy to press the spherical portions 416, 426 of the two advance-retract rods 410, 420 into the spherical recesses 64, 64 and makes it difficult for the spherical portions 416, 426 of the two advance-retract rods 410, 420 to come off the spherical recesses 64, 64. As a result, since the force required for the spherical portions 416, 426 of the two advance-retract rods 410, 420 to come off the spherical recesses 64, 64 can be made greater, retaining force of the advance-retract rods 410, 420, namely the retaining force of the tilting member (mirror surface) comprising the mirror body 2, the mirror holder 3 and the mirror holder base 6 is increased thereby improving the performance of the power unit 4.

The remote-controlled mirror apparatus for vehicles according to this embodiment of the present invention having the configuration described above operates as described below.

When the first motor 41 of the power unit 4 is actuated, drive force of the first motor 41 is transmitted via the drive force transmission mechanisms 411, 412, 413 to the first advance-retract rod 410 to cause the first advance-retract rod 410 to advance or retract. Accordingly, the mirror body 2 tilts about the first oblique axis S1—S1 (axis connecting the center P of the pivot mechanism 63 and the center of the spherical portion of the second advance-retract rod 420) via the mirror holder 3 and the mirror holder base 6. When the second motor 42 of the power unit 4 is actuated, drive force of the second motor 42 is transmitted via the drive force transmission mechanisms 421, 422, 423 to the second advance-retract rod 420 to cause the second advance-retract rod 420 to advance or retract, so that the mirror body 2 tilts about the second oblique axis S2—S2 (axis connecting the center P of the pivot mechanism 63 and the center of the spherical portion of the first advance-retract rod 410) via the mirror holder base 6 and the mirror holder 3.

Figure 2:
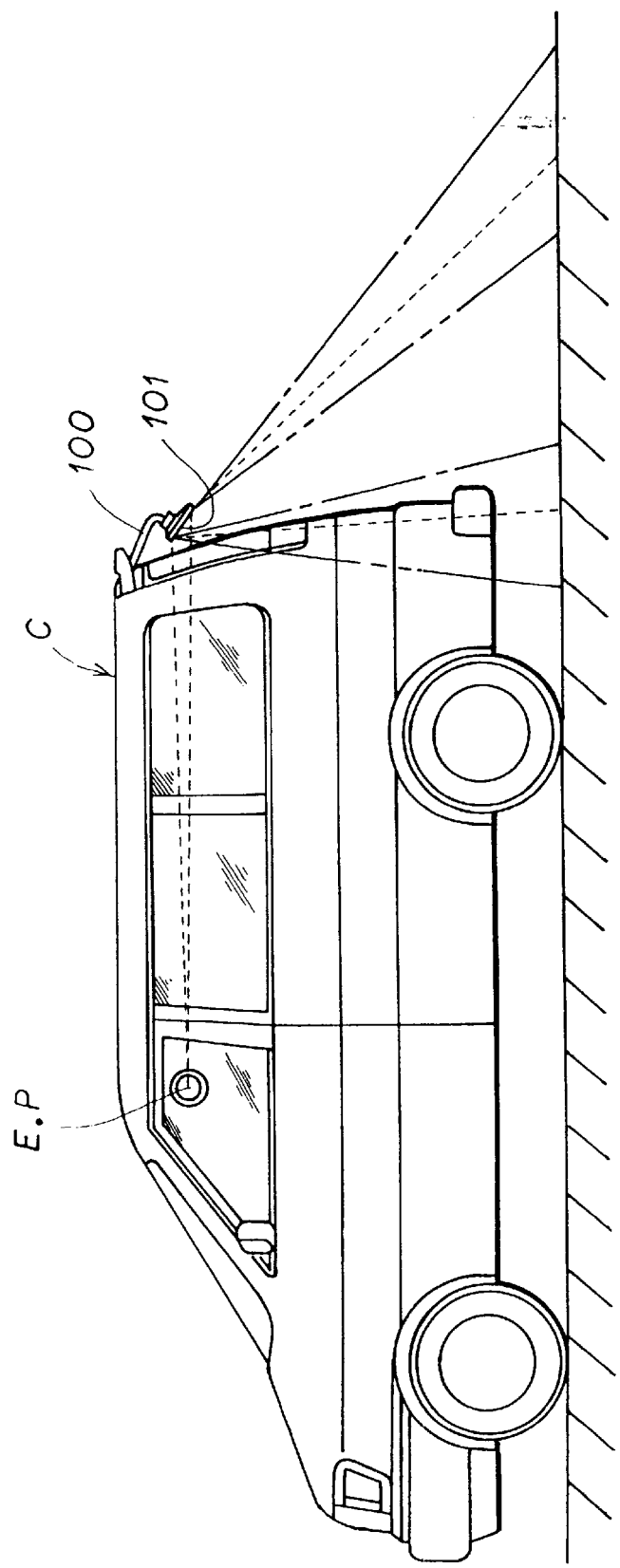
FIG. 2 is a side view showing the field of view in an example of using the remote-controlled mirror apparatus for vehicles of the prior art shown in FIG. 1 as a rear under mirror for a vehicle such as one-box car or recreational vehicle.
Figure 3:
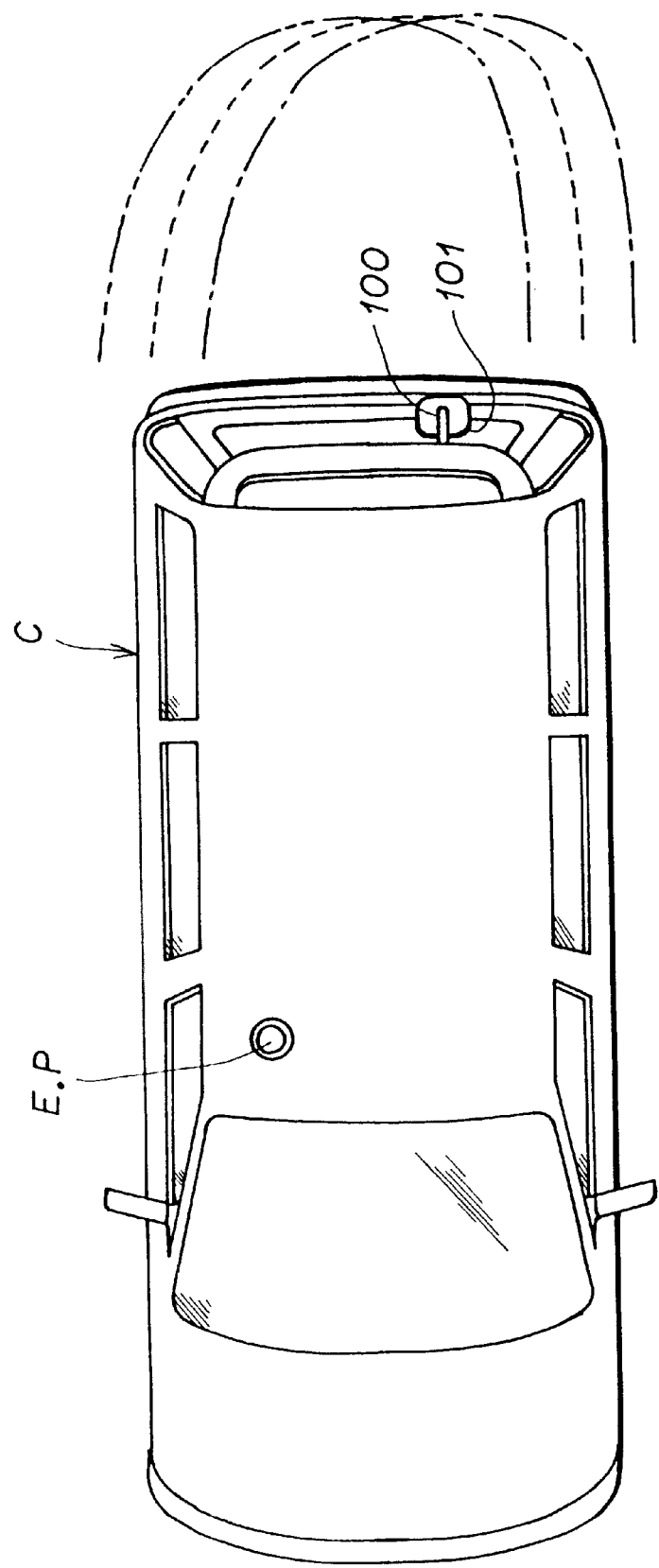
FIG. 3 is a plan view showing the field of view.
Figure 4:
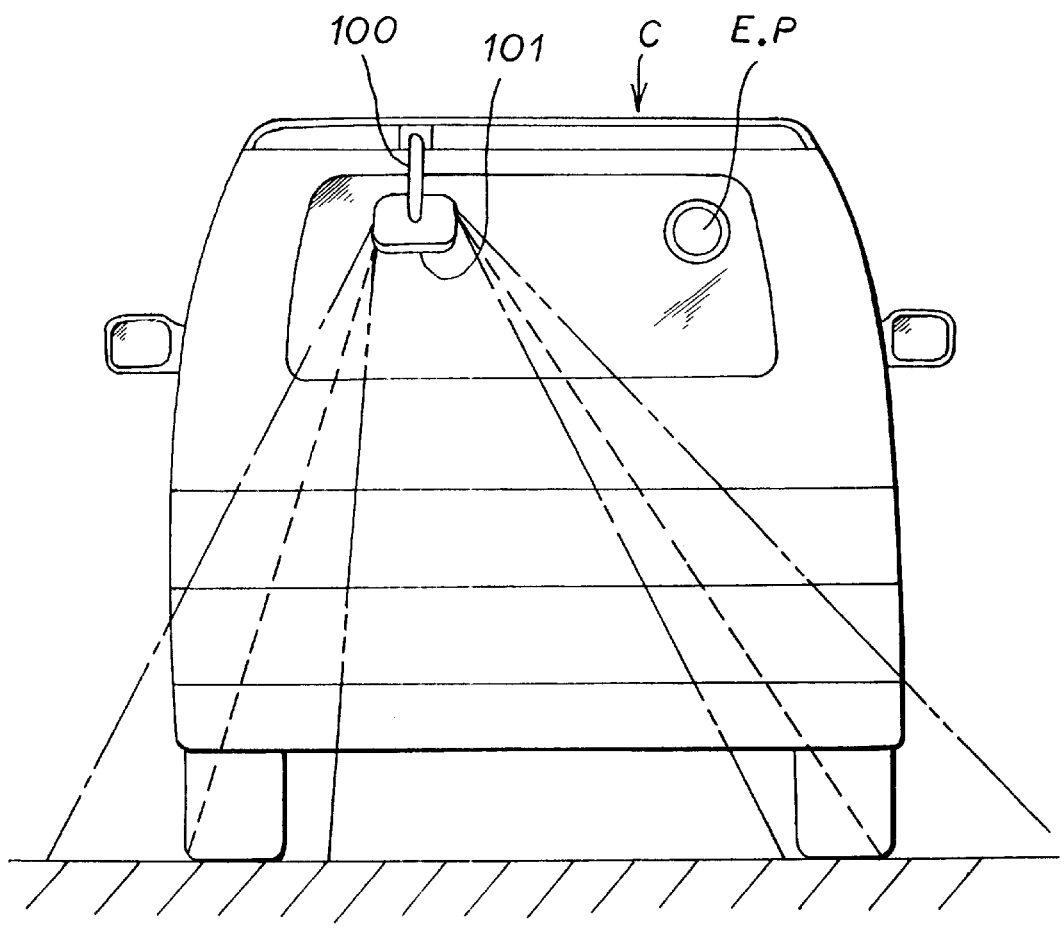
FIG. 4 is a plan view showing the field of view.
Figure 5:
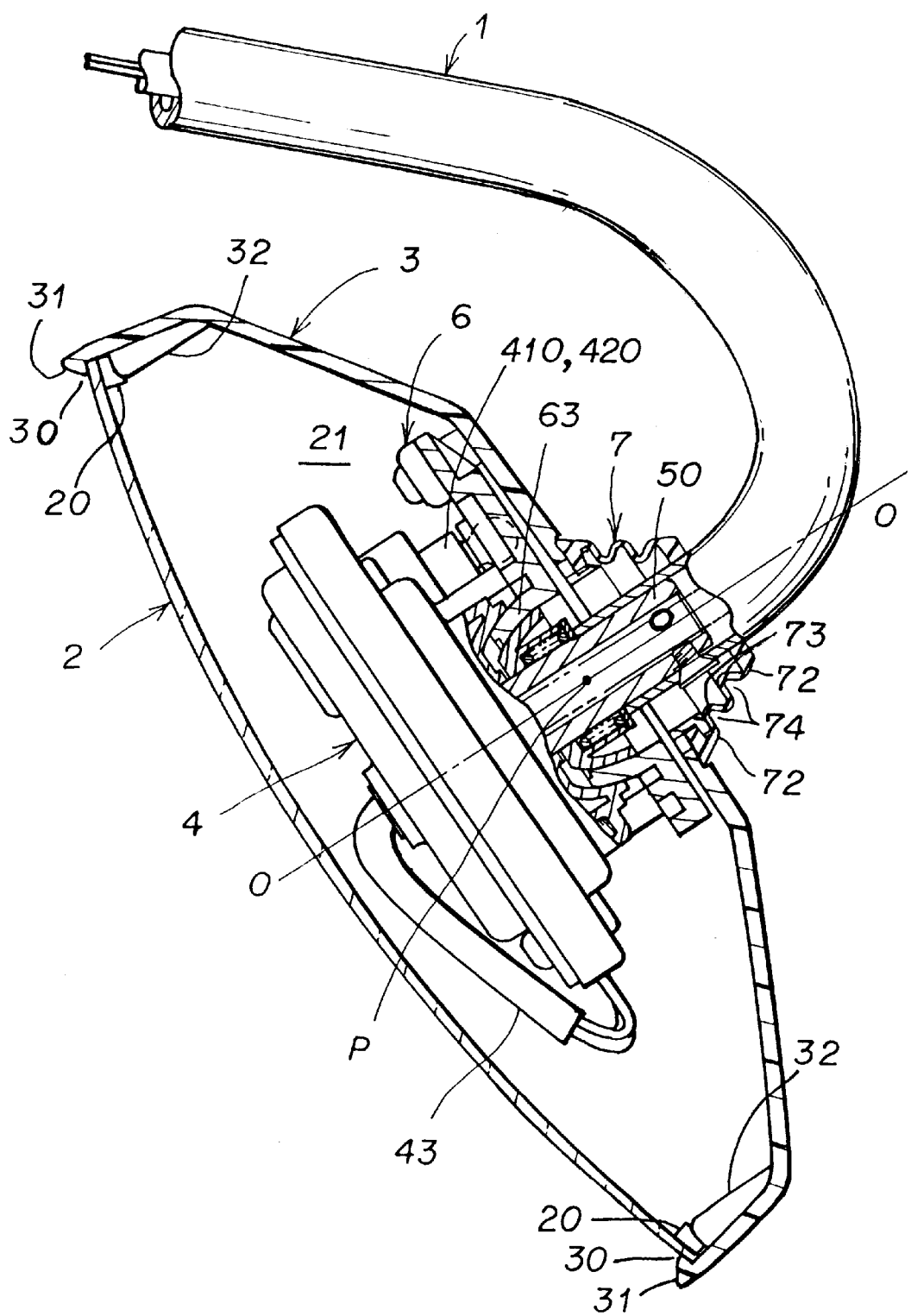
FIG. 5 is a partially cutaway view showing one embodiment of the remote-controlled mirror apparatus for vehicles of the present invention.
Figure 6:
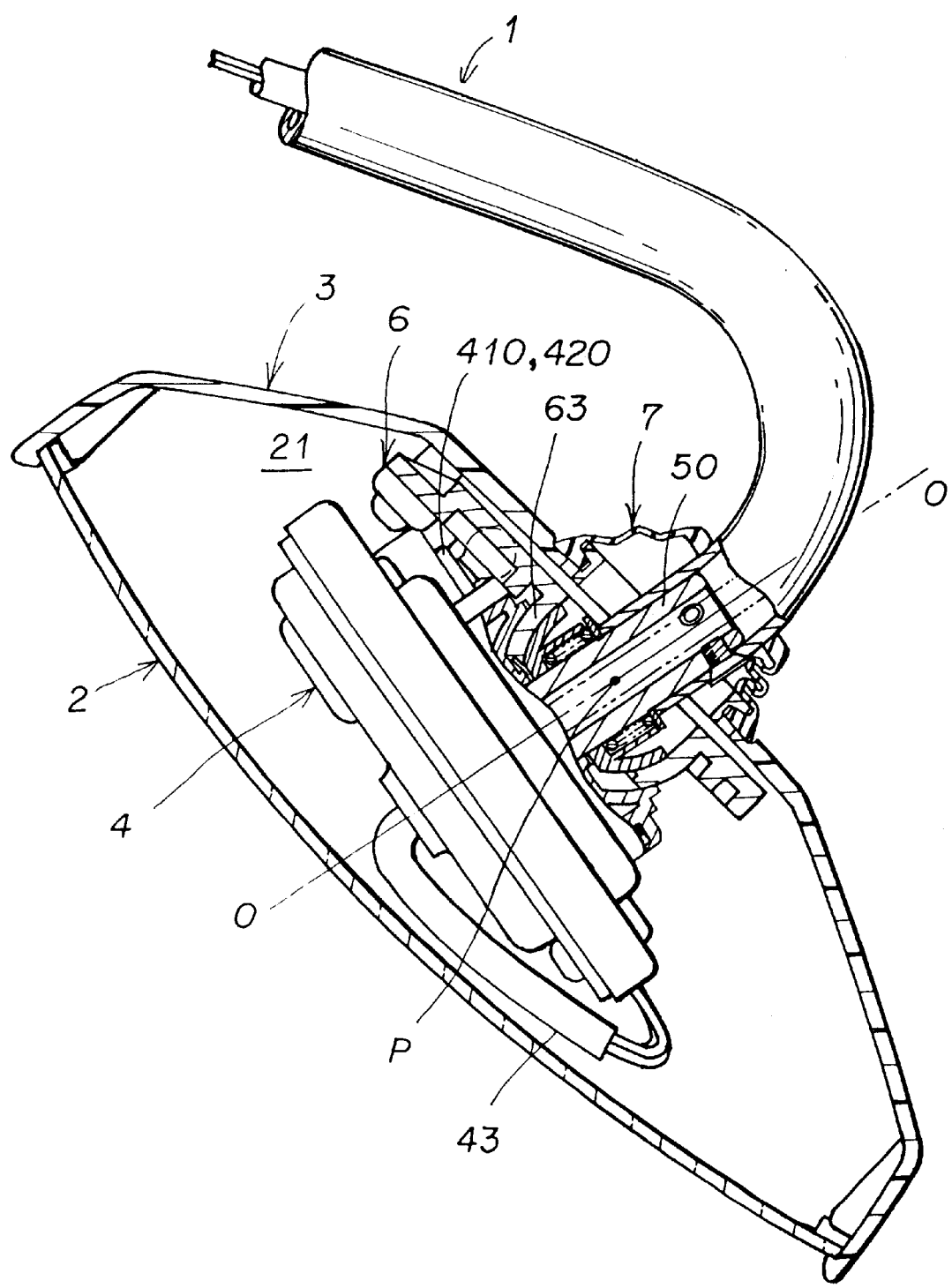
FIG. 6 is a partially cutaway view showing a state in which the mirror body and the other components are tilted downward.
Figure 7:
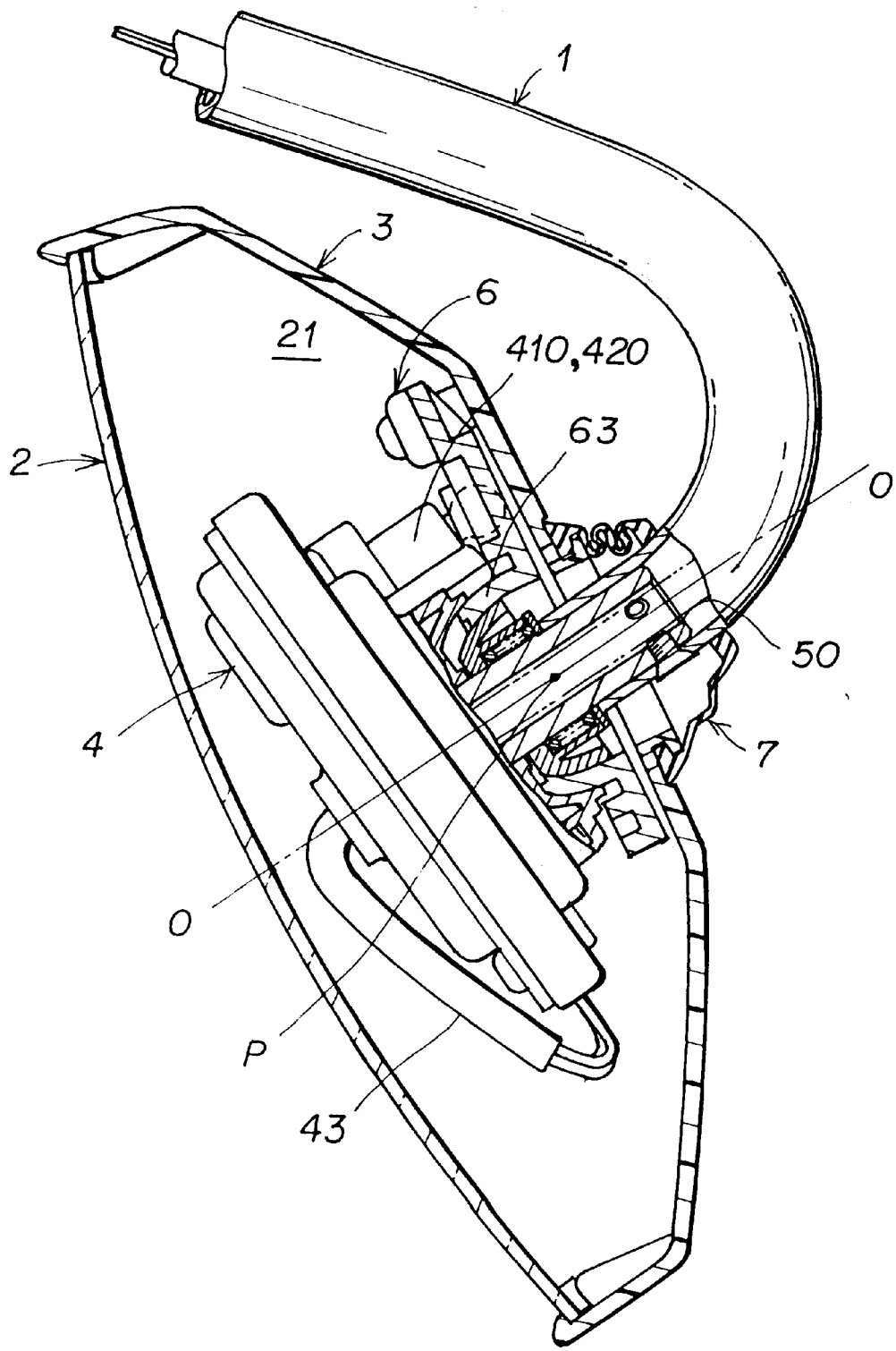
FIG. 7 is a partially cutaway view showing a state in which the mirror body and the other components are tilted upward.

As the angle of the mirror body 2 is adjusted, viewing direction can be changed to the left and right or back and forth, thus making it possible to widen the field of view in the area downward at the back of a vehicle C such as one-box car or recreational vehicle as shown in FIG. 2 through FIG. 4.

As described above, the remote-controlled mirror apparatus for vehicles according to this embodiment of the present invention tilts the mirror body 2 with respect to the power unit 4 and the stay 1 together with the mirror holder 3 having the configuration of housing and the mirror holder base 6, by actuating the power unit 4. Thus in the remote-controlled mirror apparatus for vehicles according to this embodiment of the present invention, the mirror housing 102, that contains the power unit 103, of the prior art located on the fixed side together with the power unit 103 and the stay 100, is eliminated and, instead, the mirror holder 3 having a configuration of housing that contains the power unit 4 is installed together with the mirror body 2 on the tilting side. As a consequence, when the mirror body 2 is tilted with respect to the power unit 4 and the stay 1, the mirror holder 3 is also tilted along with the mirror body 2 with respect to the power unit 4 and the stay 1, and therefore such a problem does not occur as the edge of the mirror body 101 comes inside the opening edge of the mirror housing 102 on the fixed side as in the case of the prior art. As a result, it is made possible to secure a wide field of view without the possibility of causing an obstacle to the field of view when adjusting the angle of the mirror body 2.

Also in this embodiment, periphery of the mirror body 2 is fixed on the front opening 30 of the mirror holder 3, with the waterproof boot 7 being interposed between the stay 1 and the mirror holder 3, while the chamber 21 defined by the mirror body 2 and the mirror holder 3 is closed almost airtight and the power unit 4 is housed in the closed chamber 21. Consequently, noise of the power unit 4 is reduced, and waterproof performance and dust-proof performance for the power unit 4 are improved.

While the embodiment described above is a rear under mirror for automobile used in the vehicle C such as one-box car or recreational vehicle, the remote-controlled mirror apparatus for vehicles of the present invention can be applied to vehicles other than one-box car and recreational vehicle, and to mirror apparatuses other than the rear under mirror.

What is claimed is:

1. A remote-controlled mirror apparatus for vehicles having a stay one end of which is connected to a body of the vehicle, comprising:

a power unit attached to the other end of the stay as an angle adjusting mechanism;

a mirror holder having a housing configuration attached to said power unit to be capable of tilting; and a mirror body held directly on said mirror holder to define, together with said mirror holder, a closed chamber therebetween, wherein said power unit is housed in said closed chamber, said mirror body and said mirror holder being tilted about two axes by said power unit to adjust an angle of said mirror body and said mirror holder with respect to said stay and said power unit.

2. A remote-controlled mirror apparatus for vehicles according to claim 1, wherein:

said stay is a hollow tube;

said power unit has a cavity that communicates with a cavity of said stay; and a cable harness that electrically connects said power unit and a power source is passed through the cavity of the power unit and the cavity of the stay in said chamber.

3. A remote-controlled mirror apparatus for vehicles according to claim 1, wherein:

said mirror holder has a through hole for passing the other end of said stay, while center of tilting movement of said mirror body and said mirror holder is located near said through hole.

4. A remote-controlled mirror apparatus for vehicles according to claim 1, wherein:

said power unit is provided with two advance-retract rods that advance or retract to tilt said mirror body and said mirror holder thereby adjusting the angle of said mirror body.

5. A remote-controlled mirror apparatus for vehicles according to claim 4, wherein:

said two advance-retract rods are disposed symmetrically with respect to a vertical axis, on two oblique axes that are counterparts of mutually perpendicular vertical axis and horizontal axis rotated about the intersect thereof, and on two oblique axes that are rotated by 45 degrees around the intersect, in parallel to the horizontal axis and above the horizontal axis, respectively; and wherein said power unit further comprises:

two motors disposed in V-shaped configuration symmetrically with respect to said vertical axis; and two sets of drive force transmission mechanisms interposed between said two advance-retract rods and said two motors.

6. A remote-controlled mirror apparatus for vehicles according to claim 1, wherein:

said power unit is attached to the one end of said stay to be rotatable about the center axis on the other end of said stay via a clutch mechanism.

7. A remote-controlled mirror apparatus for vehicles according to claim 6, wherein:

said clutch mechanism is a notch type clutch mechanism.

8. A remote-controlled mirror apparatus for vehicles according to claim 6, wherein:

said clutch mechanism is a friction type clutch mechanism.

9. A remote-controlled mirror apparatus for vehicles according to claim 1, wherein:

said power unit is provided with two advance-retract rods that advance or retract to tilt said mirror holder and said mirror body thereby to adjust the angle of said mirror body;

a guiding recess and a guiding projection are provided between said power unit and said mirror holder in the directions of two axes connecting center of tilting movement of said mirror holder and the mirror body and the two advance-retract rods, for guiding the tilting movement of said mirror holder and said mirror body; and said guiding projection has a cross section of forked configuration and elasticity in the direction of crossing said axis direction, and makes elastic fitting of the guiding projection having the forked cross sectional configuration and the guiding recess, thereby to prevent play from occurring in the direction that crosses said axis direction thus making it possible to guide the tilting motion of said mirror holder and said the mirror body without play.

10. A remote-controlled mirror apparatus for vehicles according to claim 1, wherein:

said mirror holder has a through hole for inserting the other end of said stay;

a waterproof boot is interposed between circumference of the through hole of said mirror holder and said stay; and said waterproof boot has a configuration of bellows with annular projections and annular recesses arranged alternately, with a part of opening between the annular projections that are adjacent to each other being disposed to face downward so that water does not build up on a part of the annular recess facing upward.

11. A remote-controlled mirror apparatus for vehicles comprising:

a stay one end of which is attached to a vehicle body;

a power unit attached to the other end of said stay as an angle adjusting mechanism;

a mirror holder having a configuration of housing attached to said power unit to be capable of tilting; and a mirror body held directly on said mirror holder to define, together with said mirror holder, a closed chamber therebetween, wherein said power unit is housed in said closed chamber, said mirror body and said mirror holder being tilted about two axes by said power unit to adjust an angle of said mirror body and said mirror holder with respect to said stay and said power unit, and wherein:

said mirror body, said mirror holder, said power unit and said stay are separate components that are held together by a tightening fixture.

12. A remote-controlled mirror apparatus for vehicles comprising:

a power unit attached to an end of said stay which extends from a vehicle body;

a mirror holder having a configuration of housing attached to said power unit to be capable of tilting; and a mirror body being held on said mirror holder to define, together with said mirror holder, a chamber wherein said power unit is housed, with said mirror body and said mirror holder being tilted thereby to adjust the angle thereof with respect to said stay and said power unit by means of said power unit;

two advance-retract rods provided in said power unit that advance or retract to tilt said mirror body and said mirror holder thereby adjusting the angle of said mirror body, said two advance-retract rods being disposed, symmetrically with respect to a vertical axis, on two oblique axes that are counterparts of mutually perpendicular vertical axis and horizontal axis rotated about the intersect thereof.

13. A remote-controlled mirror apparatus for vehicles according to claim 12, wherein:

said two advance-retract rods are disposed on two oblique axes that are rotated by 45 degrees around the intersect, in parallel to the horizontal axis and above the horizontal axis, respectively;

two motors disposed in V-shaped configuration symmetrically with respect to said vertical axis; and two sets of drive force transmission mechanisms interposed between said two advance-retract rods and said two motors.

* * * * *